(12) United States Patent
Yamaguchi

(10) Patent No.: US 8,139,258 B2
(45) Date of Patent: Mar. 20, 2012

(54) INFORMATION PROCESSING APPARATUS, CONTROL METHOD AND PROGRAM FOR LAYING OUT A PLURALITY OF JOBS ON ONE SHEET

(75) Inventor: Naohiro Yamaguchi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1363 days.

(21) Appl. No.: 11/740,441

(22) Filed: Apr. 26, 2007

(65) Prior Publication Data

US 2007/0253029 A1    Nov. 1, 2007

(30) Foreign Application Priority Data

May 1, 2006  (JP) ................... 2006-127881

(51) Int. Cl.
*G06K 15/00* (2006.01)
(52) U.S. Cl. ...................................... 358/1.18
(58) Field of Classification Search .............. 358/1.18, 358/3.29, 1.12; 399/385
See application file for complete search history.

(56) References Cited

U.S. PATENT DOCUMENTS

2005/0168775 A1*  8/2005  Liu .............................. 358/1.15

FOREIGN PATENT DOCUMENTS

JP    2000-094799    4/2000

* cited by examiner

*Primary Examiner* — Benny Tieu
*Assistant Examiner* — Sunil Chacko
(74) *Attorney, Agent, or Firm* — Fitzpatrick, Cella, Harper & Scinto

(57) ABSTRACT

Layout candidates to lay out and print a plurality of input jobs on one print sheet are created. Cutting lines on the print sheet and the number of times of rotation of the print sheet necessary in the cutting process are decided for a layout defined by each created layout candidate. Cutting difficulty corresponding to each layout candidate is calculated for each created layout candidate on the basis of the decided number of cutting lines and the decided number of times of rotation. A layout candidate having the lowest cutting difficulty among calculated cutting difficulties is selected as a layout for the jobs. Print data to print the jobs is generated on the basis of the selected layout.

19 Claims, 29 Drawing Sheets

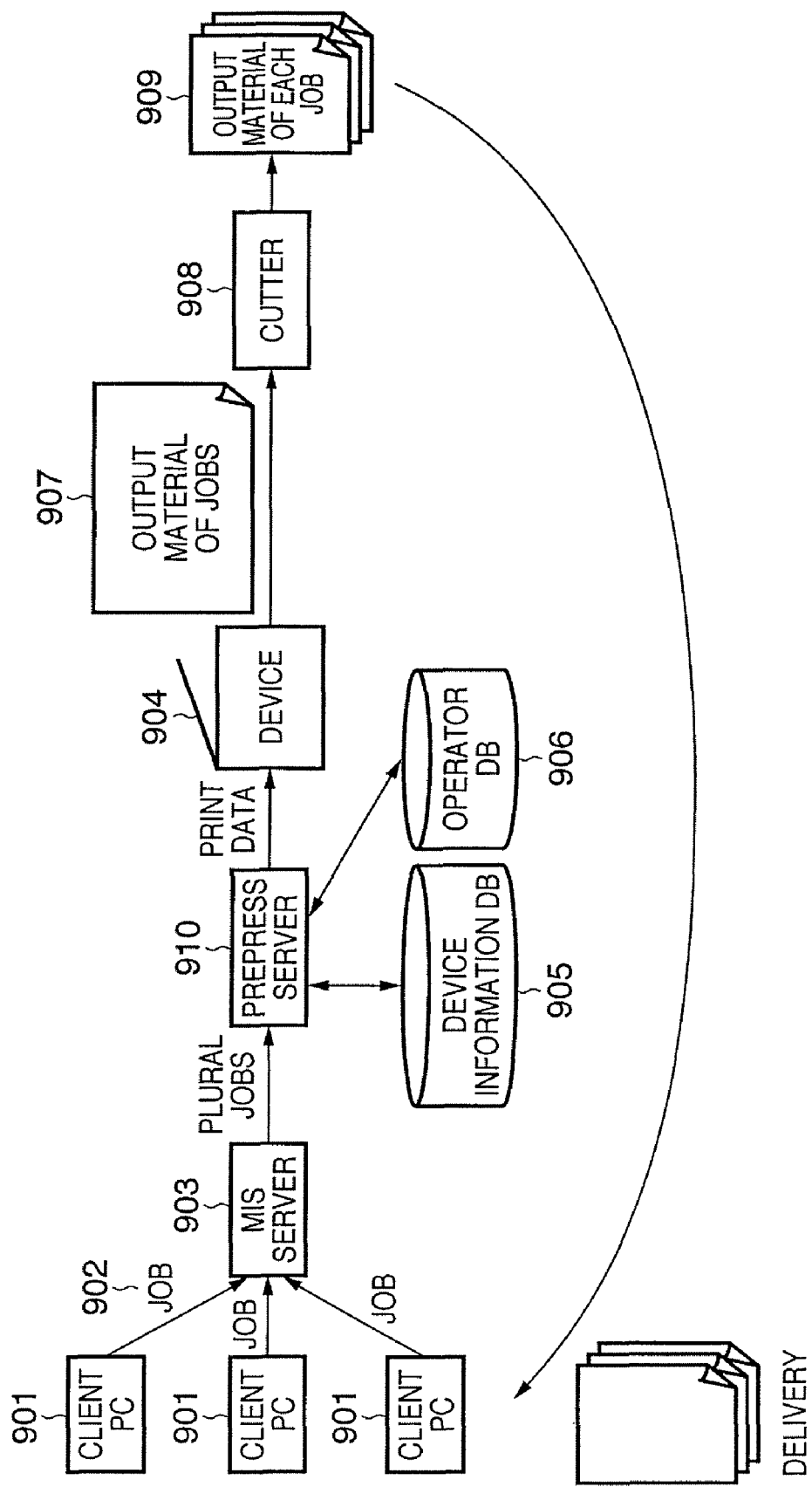

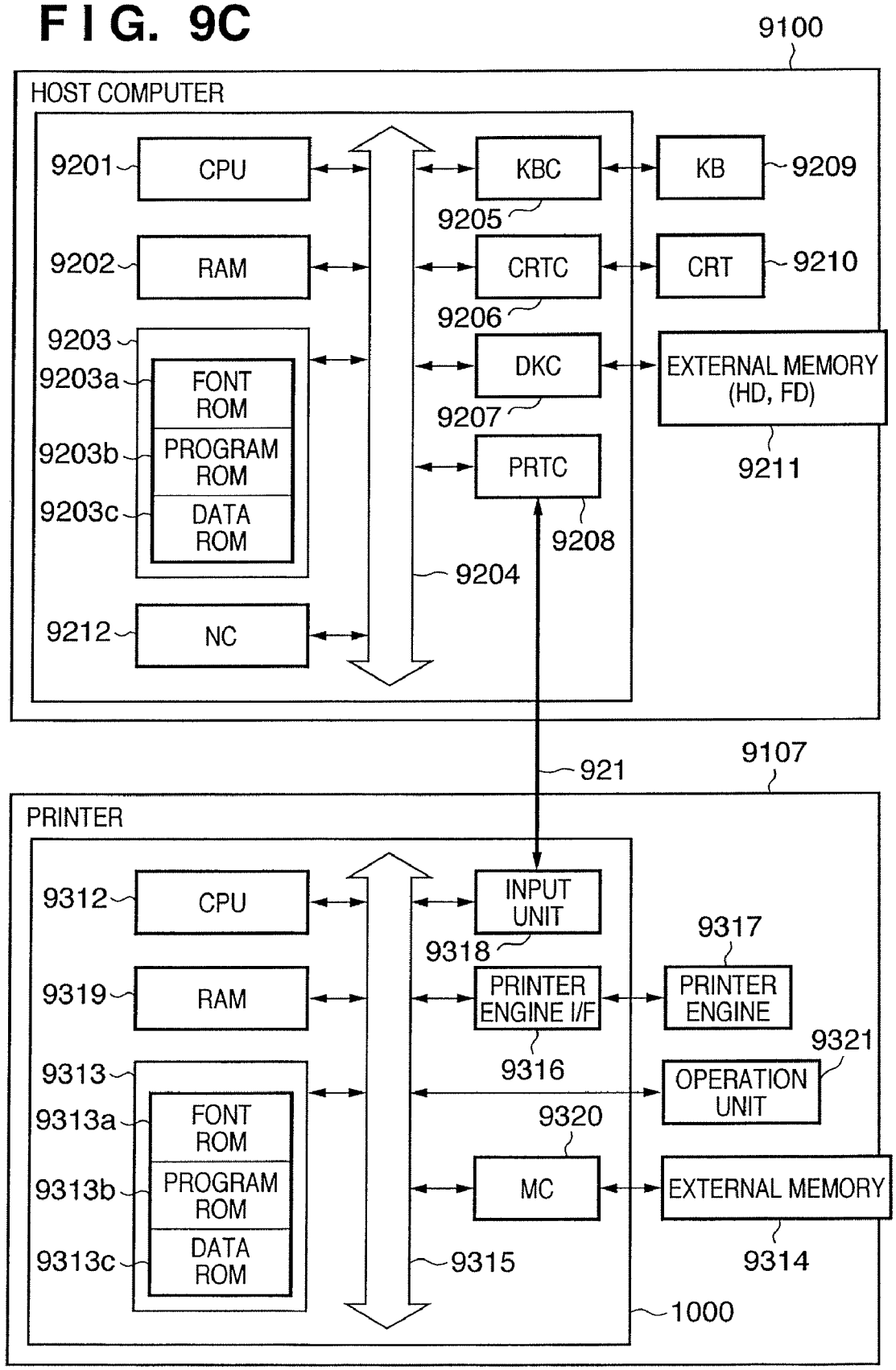

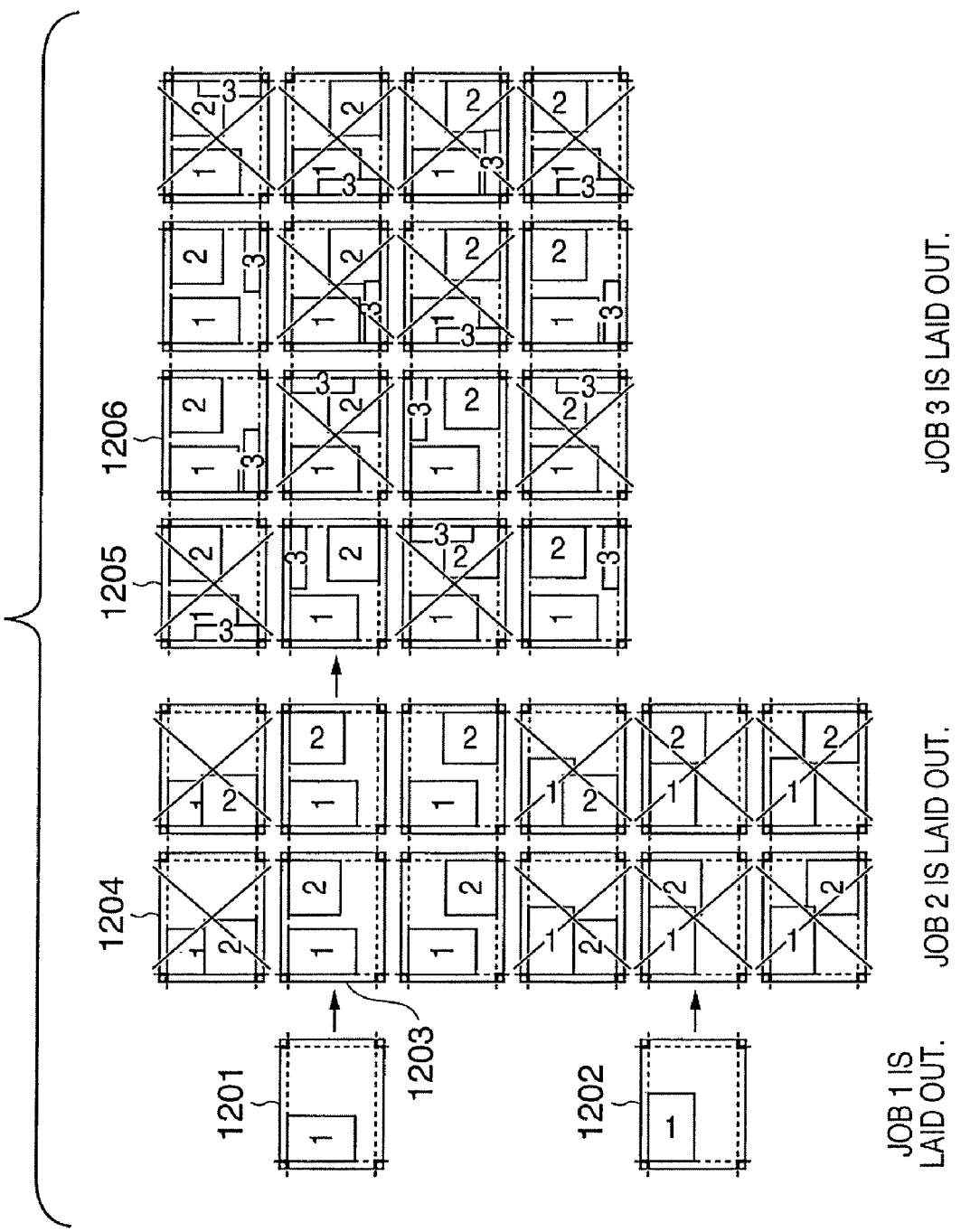

FIG. 21

DEVICE INFORMATION DB

| Device ID | Type | Alpha | Beta |
|---|---|---|---|
| Cutter-001 | Inline Cutter | 1.20 | 5.00 |
| Cutter-002 | Inline Cutter | 1.60 | 2.50 |
| Cutter-003 | Nearline Cutter | 1.20 | 4.00 |
| Cutter-004 | Offline Cutter | 1.00 | 1.00 |

~2101

OPERATOR DB

| Operator ID | Device Type | Alpha | Beta |
|---|---|---|---|
| OP-001 | Cutter-003 | 1.1 | 2.0 |
| OP-001 | Cutter-004 | 1.4 | 2.5 |
| ... | ... | ... | ... |
| OP-002 | Cutter-003 | 1.5 | 2.5 |
| OP-002 | Cutter-004 | 2.0 | 3.0 |
| ... | ... | ... | ... |
| OP-003 | Cutter-003 | 3.0 | 5.0 |
| OP-003 | Cutter-004 | 3.5 | 6.0 |
| ... | ... | ... | ... |

~2102

INFORMATION PROCESSING APPARATUS, CONTROL METHOD AND PROGRAM FOR LAYING OUT A PLURALITY OF JOBS ON ONE SHEET

BACKGROUND OF THE INVENTION

1. Field of the Invention

The present invention relates to an information processing apparatus which generates print data to lay out and print a plurality of jobs on one print sheet, a control method therefor, and a program.

2. Description of the Related Art

A commercial printing business receives an order of a creation request of printed materials (e.g., magazine, newspaper, brochure, advertisement, and gravure) from a third party (customer or client), creates printed materials desired by the client, and delivers them to the client so as to get a reward. The commercial printing business still prevalently uses a large-scale printing device such as an offset prepress and press even today.

Such commercial printing business proceeds with operations via various processes. Such processes include, for example, manuscript reception, design and layout, comprehensive layout (presentation by means of printer output), proofing (layout correction and color correction), proof print, artwork preparation, print, post-process, shipping, and the like. Artwork preparation is mandatory for use of the aforementioned printing press, and once an artwork is prepared, it is not easy and is disadvantageous in terms of cost to correct it. Hence, elaborate proofing, i.e., layout checking and color confirmation operations are indispensable.

In this manner, such printing business requires a large-scale device, and takes considerable time to create printed materials desired by clients. These operations require expert knowledge, i.e., know-how of experts called craftsmen.

Meanwhile, in recent years, along with the advent of high-speed, high-quality electrophotographic printing devices and inkjet printing devices, a so-called print-on-demand market prevails as competition with the aforementioned printing business. Print-on-demand will be abbreviated as POD hereinafter.

The POD aims at handling the print process within a short delivery period by dividing a job to be handled by a printing device into those of relatively smaller lots without using any large-scale device or system. Especially, this POD implements digital prints using digital data by fully utilizing a digital image forming apparatus such as a digital copying machine, digital multifunction peripheral, and the like in place of the large-scale printing press and printing scheme. A POD market as a POD-based business category has been developed. Such POD market merges digitalization compared to the conventional printing business, effectively utilizes computerized management and control, and makes an attempt to reach the printing business level using computers.

In such situation, PFP as a print service of a copy/print shop, CRD as an in-house print service, and the like are known in the POD market. Note that PFP is short for Print For Pay, and CRD is short for Centralized Reproduction Department.

The printing business and POD market have proposed services to execute all tasks at once instead of the party concerned. These tasks include reception and placement of an order for a printed material as merchandise, packing, delivery, after-sale services, inventory control, and payment control. However, there is room to study.

The printing business and POD market have examined even a system which supports business planning and administrative tasks through collection, processing, and reports of production-related data. Such system accumulates information, and provides proper information to a requiring section as needed. In the current situation, however, no optimum system has been implemented or applied yet.

At present, the POD market cannot employ a skilled operator, unlike the conventional printing business. Demands have also arisen for achieving a job at low cost, doing business with small investments, and reducing TCO. However, since the POD market is new, it cannot fully meet these demands, and problems are left unsolved. TCO is short for Total Cost of Ownership.

The printing business and POD market adopt a technique of laying out and printing a plurality of data (manuscript data) such as photos on one print sheet, and then cutting the print sheet. For example, a plurality of fixed-form data such as photos are imposed on one print sheet. At this time, there is a technique of reducing the number of times of cutting by setting the print area to a sheet edge, or making the print area adjacent to another data to share the printer's mark.

It is common practice to merge a plurality of print jobs into one print job (gang job), print the gang job, and cut the resultant printed material into those corresponding to the respective print jobs (Japanese Patent Laid-Open No. 2000-94799).

In conventional gang job printing by digital prints, the cutting process requires a longer process time than those of pre-processes (layout and printing). Further, the process time of the cutting process greatly changes because the cutting procedures are different between layouts.

Even if gang job printing or printing of multiple pages/sheet is executed to reduce the cost and shorten the print time, the cutting process takes a long time depending on the layout. The work load per unit time increases, failing to reduce the final cost and shorten the process time.

SUMMARY OF THE INVENTION

The present invention has been made to overcome the conventional drawbacks, and has as its object to provide an information processing apparatus capable of increasing the total throughput of a printing and bookbinding system, a control method therefor, and a program.

According to one aspect of the present invention, an information processing apparatus which generates print data to lay out and print a plurality of jobs on one print sheet, comprising:

creation means for creating a plurality of layout candidates to lay out and print a plurality of input jobs on one print sheet;

decision means for deciding the number of times of cutting based on cutting lines on the print sheet and the number of times of rotation of the print sheet necessary in a cutting process for a layout defined by each layout candidate created by the creation means;

input means for inputting a selection condition to select one layout candidate from the plurality of layout candidates;

selection means for selecting a layout candidate to be applied to the plurality of jobs from the plurality of layout candidates created by the creation means, on the basis of the selection condition input by the input means and the number of times of cutting or the number of times of rotation decided by the decision means; and generation means for generating print data to print the plurality of jobs on one print sheet in accordance with the layout candidate selected by the selection means.

In a preferred embodiment, the apparatus further comprises:

first setting means for setting level of importance for the number of times of cutting and the number of times of rotation as the selection condition; and calculation means for calculating, on the basis of the level of importance set by the first setting means, cutting difficulty from the number of times of cutting and the number of times of rotation decided by the decision means for each layout candidate created by the creation means.

In a preferred embodiment, the generation means generates, on the basis of the layout selected by the selection means, print data to print a cutting line of the layout and a cutting order number representing a cutting order of the cutting line.

In a preferred embodiment, when the number of jobs to be processed is not less than a predetermined value, the creation means creates a layout candidate to lay out and print the jobs to be processed on one print sheet in area order.

In a preferred embodiment, when a plurality of layout candidates with lowest cutting difficulty among cutting difficulties calculated by the calculation means exist, the selection means generates a selection window to select one of the layout candidates having the lowest cutting difficulty, and selects a layout candidate selected via the selection window as a layout for the plurality of jobs.

In a preferred embodiment, when no selection is made via the selection window, the selection means generates a confirmation window to confirm whether to comply with a default setting layout candidate, and when an instruction to comply with the default setting layout candidate is input via the confirmation window, selects the default setting layout candidate as a layout for the plurality of jobs.

In a preferred embodiment, the apparatus further comprises second setting means for setting a limit value of the number of times of cutting and a limit value of the number of times of rotation in correspondence with the layout candidate selected by the selection means.

In a preferred embodiment, when the second setting means sets limit values, the selection means selects a layout candidate in accordance with the selection condition from layout candidates which satisfy the limit values.

In a preferred embodiment, the apparatus further comprises post-processing apparatus selection means for selecting a type of post-processing apparatus for a printed material based on the print data, wherein the calculation means calculates cutting difficulty corresponding to each layout candidate for each layout candidate created by the creation means on the basis of the number of times of cutting and the number of times of rotation decided by the decision means, and device information of a post-processing apparatus selected by the post-processing apparatus selection means.

According to another aspect of the present invention, a method of controlling an information processing apparatus which generates print data to lay out and print a plurality of jobs on one print sheet, comprising:

a creation step of creating a plurality of layout candidates to lay out and print a plurality of input jobs on one print sheet;

a decision step of deciding the number of times of cutting based on cutting lines on the print sheet and the number of times of rotation of the print sheet necessary in a cutting process for a layout defined by each layout candidate created in the creation step;

an input step of inputting a selection condition to select one layout candidate from the plurality of layout candidates;

a selection step of selecting a layout candidate to be applied to the plurality of jobs from the plurality of layout candidates created in the creation step, on the basis of the selection condition input in the input step and the number of times of cutting or the number of times of rotation decided in the decision step; and a generation step of generating print data to print the plurality of jobs on one print sheet in accordance with the layout candidate selected in the selection step.

According to still another aspect of the present invention, a program for causing a computer to control an information processing apparatus which generates print data to lay out and print a plurality of jobs on one print sheet is provided. The program causes the computer to execute a creation step of creating a plurality of layout candidates to lay out and print a plurality of input jobs on one print sheet, a decision step of deciding the number of times of cutting based on cutting lines on the print sheet and the number of times of rotation of the print sheet necessary in a cutting process for a layout defined by each layout candidate created in the creation step, an input step of inputting a selection condition to select one layout candidate from the plurality of layout candidates, a selection step of selecting a layout candidate to be applied to the plurality of jobs from the plurality of layout candidates created in the creation step, on the basis of the selection condition input in the input step and the number of times of cutting or the number of times of rotation decided in the decision step, and a generation step of generating print data to print the plurality of jobs on one print sheet in accordance with the layout candidate selected in the selection step.

Further features of the present invention will be apparent from the following description of exemplary embodiments with reference to the attached drawings.

BRIEF DESCRIPTION OF THE DRAWINGS

FIG. 9A is a view showing an example of the configuration of a printing and bookbinding system according to the first embodiment of the present invention;

FIG. 9C is a block diagram showing the hardware configuration of the printing and bookbinding system according to the first embodiment of the present invention;

FIGS. 12A and 12B are views showing layout examples by the layout process in FIGS. 11A and 11B according to the first embodiment of the present invention;

FIG. 21 is a conceptual table showing an operator DB and device information DB according to the third embodiment of the present invention.

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

The present invention will describe a configuration capable of shortening the time by automatically selecting settings to minimize the process time up to the cutting process when a printing and bookbinding system lays out and outputs a plurality of jobs on one sheet for the purpose of a short print time and the like.

The present invention will also describe a configuration capable of easily selecting settings to minimize the process time up to the cutting process within a predetermined printing cost from various layout combinations of jobs in gang job printing.

The present invention will also describe a configuration capable of reducing cutting errors by an operator who performs the cutting process, by printing cutting procedures (cutting order numbers) on printer's marks (cutting lines) on a sheet.

Prior to a description of embodiments of the present invention, the basic configuration as the premise of the embodiments will be explained.

[Configuration of Overall System]

Figure 1:
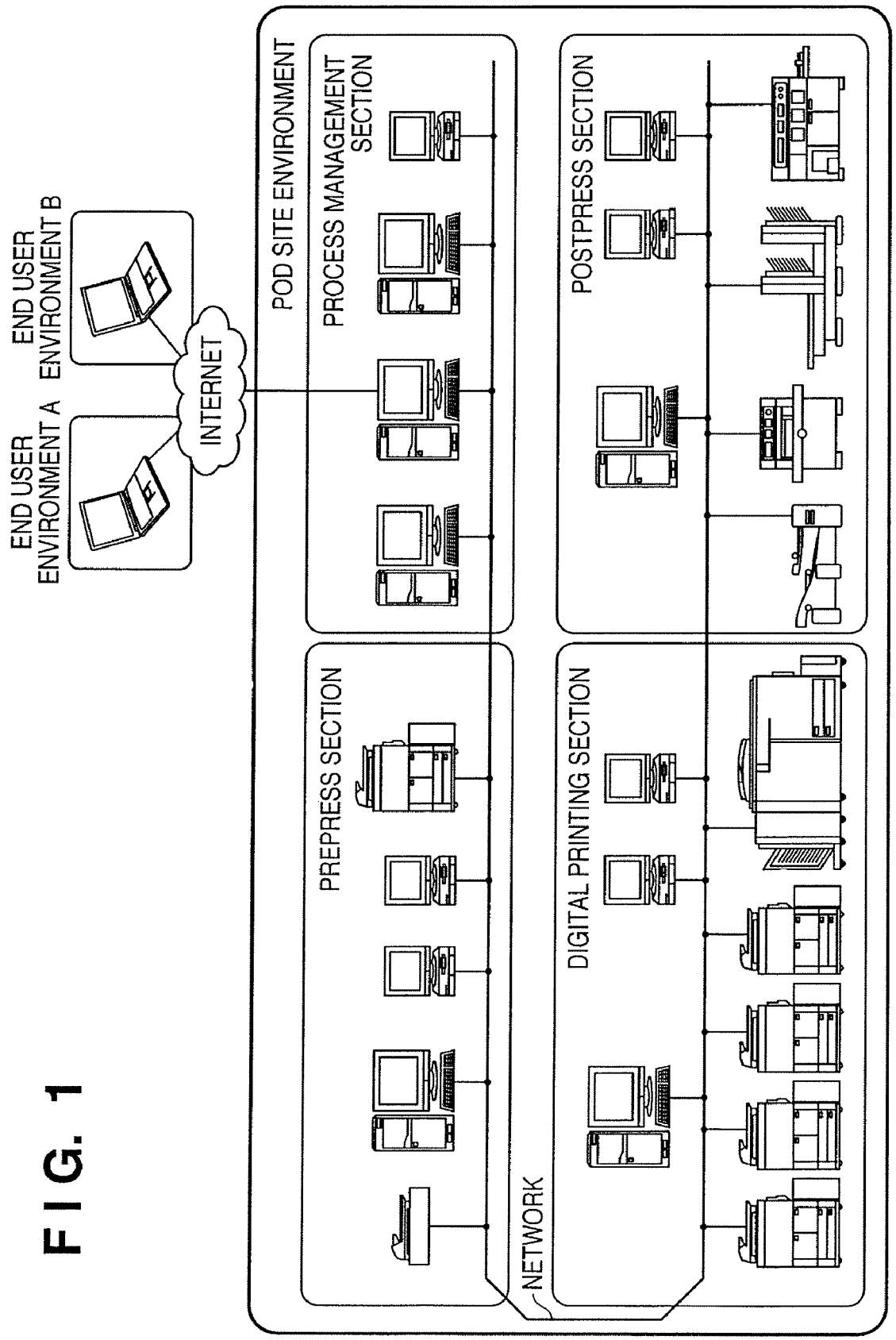
FIG. 1 is a block diagram showing an example of the basic configuration of an overall printing and bookbinding system.

FIG. 1 is a block diagram showing an example of the basic configuration of the overall printing and bookbinding system.

The printing and bookbinding system in the block diagram of FIG. 1 comprises one or a plurality of end user environments, and a POD (Print On Demand) site environment connected via the Internet. A user who places an order of printing exists in the end user environment. Users can use client PCs in end user environments (in this case, end user environments A and B) to request a print job, check the job status, and the like.

The POD site environment generally comprises a process management section, prepress section, digital printing section, and postpress section. These sections connect to each other via a network.

The process management section designates work in processes by the process management section, prepress section, digital printing section, and postpress section in the POD site environment, and centralizes the workflow of the system having computers and various devices. The process management section receives and saves a job from an end user. The process management section composes work of each process into a workflow, and efficiently schedules work by each device or each operator on the basis of designation of a job from an end user.

The prepress section uses a scanning device such as a scanner or MFP to scan a paper manuscript received from an end user on the basis of a prepress job work instruction received from the process management section. The prepress section inputs an image obtained by scanning as a scanned image file to a prepress server or client PC.

In addition, the prepress section executes various processes such as image correction, file merge, page insertion/deletion, various page layout editing processes, and the imposition process. The prepress section also outputs a proof in order to check the layout and color tint of a final product, as needed.

The MFP stands for a multi function peripheral.

The digital printing section uses a scanning and printing device to copy a paper manuscript received from an end user in accordance with the work instruction of a print job received from the process management section or prepress section. Further, the digital printing section prints out, to a printing device, a file received from a client PC via a printer driver or hot folder.

Examples of the received file are a document/image file received from an end user, a scanned image file obtained from a scanning device, and a document/image file obtained by editing these files. Examples of the scanning and printing device are a monochrome MFP and color MFP.

The postpress section controls post-processing devices such as a paper folding machine, saddle stitcher, case binding machine, cutter, inserter, and collator in accordance with the work instruction of a postpress job received from the process management section, prepress section, or digital printing section. Also, the postpress section executes finishing processes such as paper folding, saddle stitching, case binding, cutting, insertion, and collation for print sheets out from the digital printing section.

[System Configuration of Process Management Section]

Figure 2:
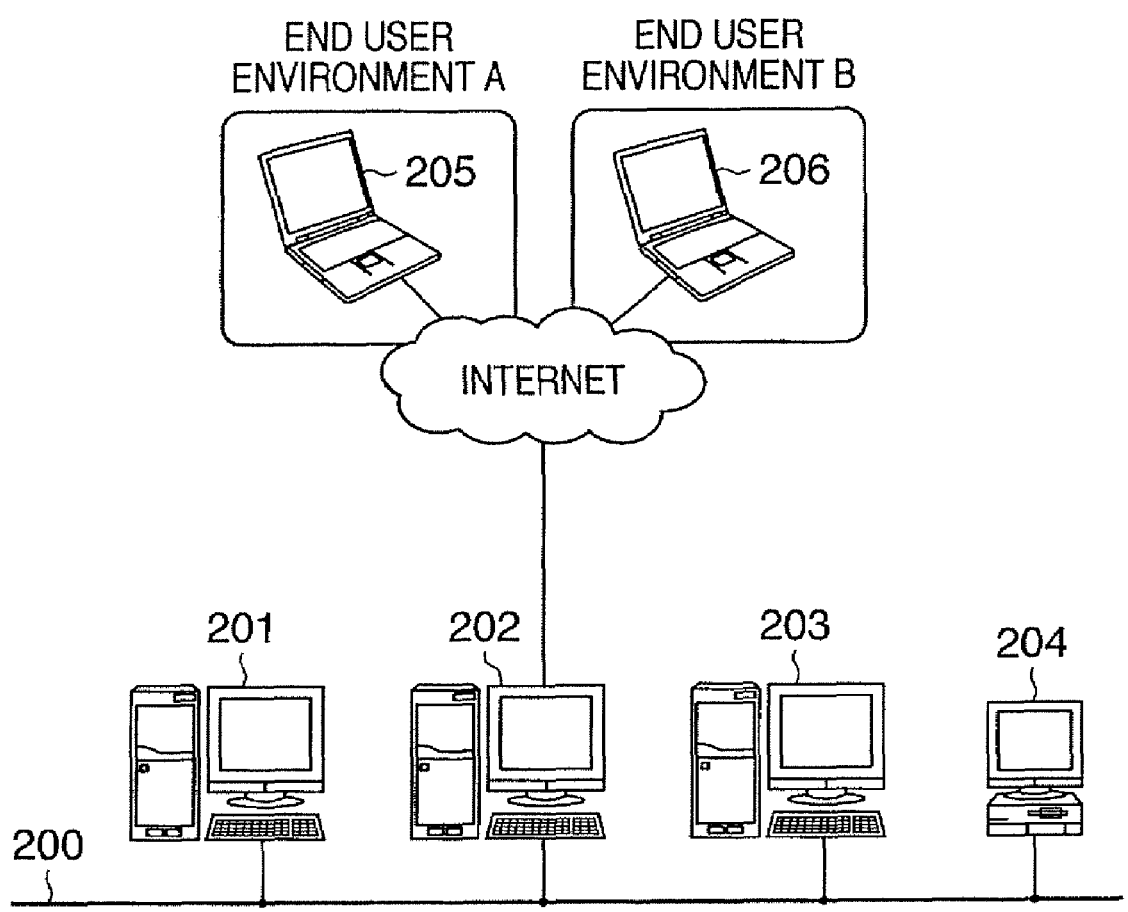
FIG. 2 is a view showing an example of the configuration of a process management section.

FIG. 2 is a view showing an example of the configuration of the process management section.

The process management section comprises a MIS (Management Information System) server 201, order receiving server 202, file server 203, and client PC 204 which are connected to a network 200.

The MIS server 201 manages the workflow of the whole system from reception of an order to delivery, and comprehensively manages various kinds of management information and sales information.

The order receiving server 202 receives jobs from client PCs 205 and 206 in end user environments by using the Internet. The order receiving server 202 manages a received job by its ID number. The order receiving server 202 transmits the ID number and information necessary for management to the MIS server 201, and also transmits them to downstream processes together with another information such as image data in accordance with an instruction from the MIS server 201.

The file server 203 is a document management server for saving a job received from the client PC 205 or 206 in preparation for a reorder of the same manuscript from the client PC 205 or 206 in the end user environment. In general, the file server 203 saves image data and job setting information (job ticket) used for previous output together.

The MIS server 201, order receiving server 202, file server 203, and client PC 204 in the process management section exchange information using, e.g., a job ticket called JDF which describes a job work instruction. The JDF transfers jobs and issues control commands to automate total workflow centered on the process management section in cooperation with the prepress section, digital printing section, postpress section, and the like.

The JDF stands for Job Definition Format.

[System Configuration of Prepress Section]

Figure 3:
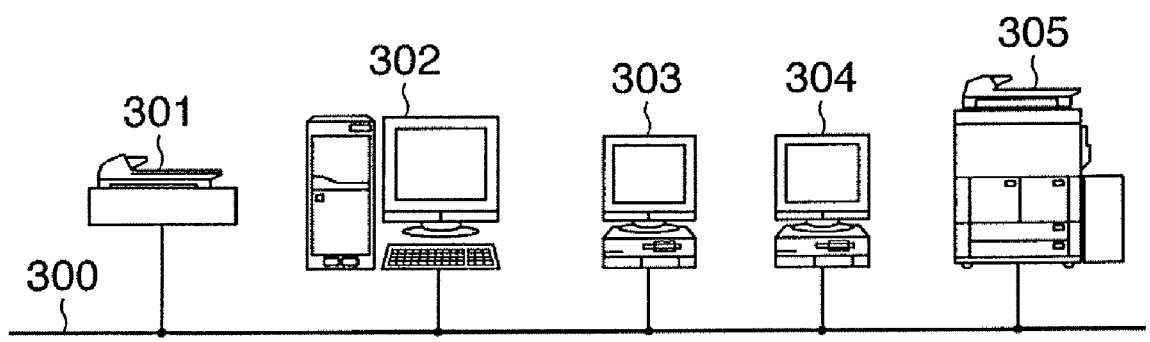
FIG. 3 is a view showing an example of the configuration of a prepress section.

FIG. 3 is a view showing an example of the configuration of the prepress section.

A prepress server 302 uses a scanning device such as a scanner 301 or MFP 305 to scan a paper manuscript and receive the data as a scanned image file. The prepress server 302 executes image correction such as skew correction or black dot removal for the received scanned image file. The prepress server 302 merges received document/image files and image files scanned by the scanning device. The prepress server 302 executes the imposition process and various page layout editing processes such as page insertion/deletion, addition of a page number or annotation, insertion of an index sheet, cover sheet, or slip sheet, and designation of N-up printing or double copy.

The prepress section may be formed from one prepress server 302, and client PCs 303 and 304, or from only the client PCs 303 and 304 without the prepress server 302.

When the received job is a copy job, the operator scans a paper manuscript with a scanning device such as the scanner 301 or MFP 305, and inputs the data as a scanned image file to the prepress server 302 or the client PC 303 or 304. If the scanned image skews, the skew is corrected by executing skew correction. If the scanned image has a punch hole or dust, the punch hole or dust can be removed by executing black dot removal.

When the received job is a print job, the operator inputs a received document/image file to the prepress server 302 or the client PC 303 or 304. When there are a plurality of received document/image files or a plurality of image files scanned by the scanning device, these files are merged.

When a received document/image file or an image file scanned by the scanning device needs to be further edited, for example, the operator can edit it while confirming the layout of pages. For example, the operator can insert a page from another file into a target file or delete a page of a target file.

The operator can add a page number or annotation (text or image such as a watermark or logotype representing confidential information), or designate N-up printing or double copy (printing to lay out a plurality of pages on one print plane). The operator can insert an index sheet, cover sheet, or slip sheet, or designate a post-process such as stapling, punching, or Z-folding. In this manner, the operator executes various page layout editing processes and the imposition process.

To implement one-to-one marketing of direct mail address printing or customer-specific brochure printing, the prepress section prints copies of a single document in cooperation with a database in the prepress server 302 or another server. In parallel with this, the prepress section can also build a variable printing system which replaces the address and related data and prints them.

A printing business requires an output called a color comprehensive layout aimed at presentation to an advertising client before the prepress and press processes. A recent color comprehensive layout uses a color hard copy of a digital color image output from a color output device after processed by DTP for creating a publication using a personal computer or by CEPS used to modify or composite an image in the press process.

The DTP stands for Desk Top Publishing. The CEPS stands for Color Electronic Prepress System. The color output device includes a color MFP, color printer, and color plotter.

The POD using a color printer such as a color MFP can provide proof output for layout check equivalent to a comprehensive layout, simple color tint check, and detailed color tint check equivalent to a proof. More specifically, a color printer such as a color MFP (or a monochrome printer such as a monochrome MFP) can output a proof.

If necessary, the prepress section can output a proof to the MFP in order to check the layout and color tint of a final product.

The prepress server 302, client PCs 303 and 304, scanner 301, and MFP 305 in the prepress section connect to each other via a network 300. These devices process a job received by the prepress section by transferring the job and issuing a control command via the network 300.

[System Configuration of Digital Printing Section]

Figure 4:
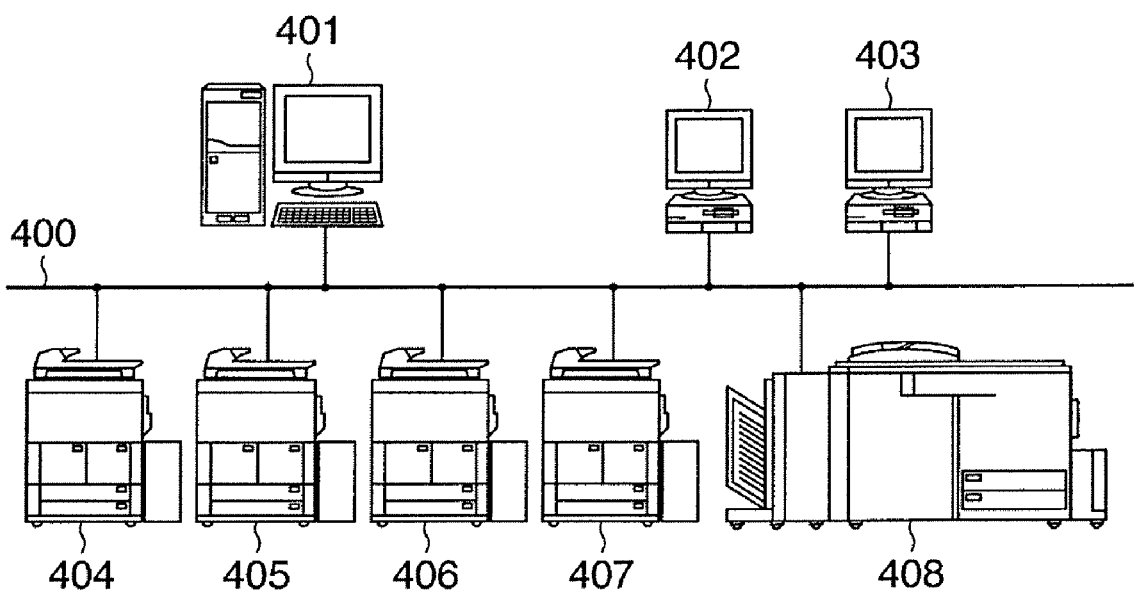
FIG. 4 is a view showing an example of the configuration of a digital printing section.

FIG. 4 is a view showing an example of the configuration of the digital printing section.

In FIG. 4, a print server 401, client PCs 402 and 403, monochrome MFPs 404 and 405, and color MFPs 406, 407, and 408 connect to a network 400. The number of devices of each type is arbitrary.

The print server 401 has two roles. One role is to transmit/receive information to/from outside the digital printing section. The print server 401 receives image information, setting information, and the like of a submitted job, and after the job ends, announces information such as the status outside the digital printing section. The other role is to manage and control devices in the digital printing section. The print server centralizes externally input jobs and jobs generated in the digital printing section.

The print server 401 can monitor the statuses of all devices and all jobs in the digital printing section. Also, the print server 401 can control job suspension, setting change, print resume, job copy/movement/deletion, and the like.

The client PCs 402 and 403 have a role of editing an input application file, designating printing, and inputting a print ready file. The client PCs 402 and 403 also have a role of assisting monitoring and control of devices and jobs managed in the print server 401.

The monochrome MFPs 404 and 405, and the color MFPs 406, 407, and 408 are image forming apparatuses having various functions such as scanning, printing, and copying. The color MFP and monochrome MFP are different in speed, cost, and the like, and are selectively used in accordance with application purposes.

[System Configuration of Postpress Section]

Figure 5:
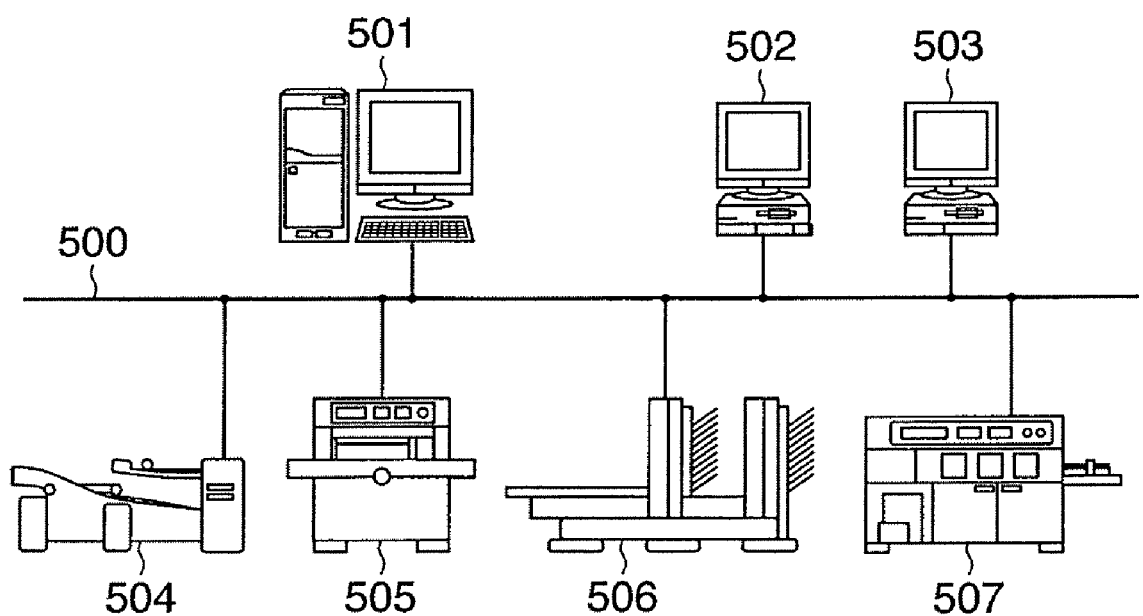
FIG. 5 is a view showing an example of the configuration of a postpress section.

FIG. 5 is a view showing an example of the configuration of the postpress section.

The postpress section comprises a postpress server 501, client PCs 502 and 503, and post-processing apparatuses typified by a paper folding apparatus 504, cutting apparatus 505, saddle stitching apparatus 506, and case binding apparatus 507.

The postpress server 501 is a computer which comprehensively manages post-processes, and creates post-process conditions finishable by the postpress section on the basis of a job instruction accepted by the order receiving server 202, a job instruction output from the MIS server 201, and the like. The postpress server 501 designates a post-process (finishing process) requested by an end user. The postpress server 501 generally uses an information exchange means such as the JDF with the outside of the postpress section to exchange information with post-processing apparatuses on the basis of the internal command and status of the postpress section.

Post-processing apparatuses can be roughly classified into three categories and are defined as follows. Only 2) nearline finisher and 3) offline finisher will be described later.

1) Inline finisher: a post-processing apparatus which has a paper path physically connected to an MFP and can electrically transmit/receive an operation instruction and status check to/from the MFP.

2) Nearline finisher: a post-processing apparatus which has a paper path not physically connected to an MFP, requests an operator to carry and set an output material, and can electrically transmit/receive an operation instruction and status check via a communication means such as a network.

3) Offline finisher: a post-processing apparatus which has neither a paper path nor an operation instruction/status check communication means connected to an MFP, and requests an operator to carry and set an output material, manually input an operation, and visually check a status report from the apparatus.

Post-processing apparatuses execute post-processes to perform various sheet processes for sheets of an output manuscript printed by an image forming apparatus such as an MFP. The post-processes include a cutting process, saddle stitching process, case binding process, paper folding process, punching process, insertion process, and collation process. The post-processing apparatuses process sheets into a bookbinding form provided to an end user.

Nearline finishers (sometimes including offline finishers) managed by the postpress server 501 include the paper folding apparatus 504, cutting apparatus 505, saddle stitching apparatus 506, and case binding apparatus 507. In addition, there are various nearline finishers such as a stapler, puncher, inserter, and collator. The postpress server 501 grasps the statuses of devices and jobs and manages the job execution status by, e.g., sequential polling based on a predetermined protocol with these nearline finishers.

This configuration may allow respective sheet processing apparatuses to execute the above-mentioned sheet processes, or one sheet processing apparatus to execute a plurality of types of sheet processes. The system may comprise one of the sheet processing apparatuses.

[Mechanism of JDF-Based Bookbinding]

Figure 6:
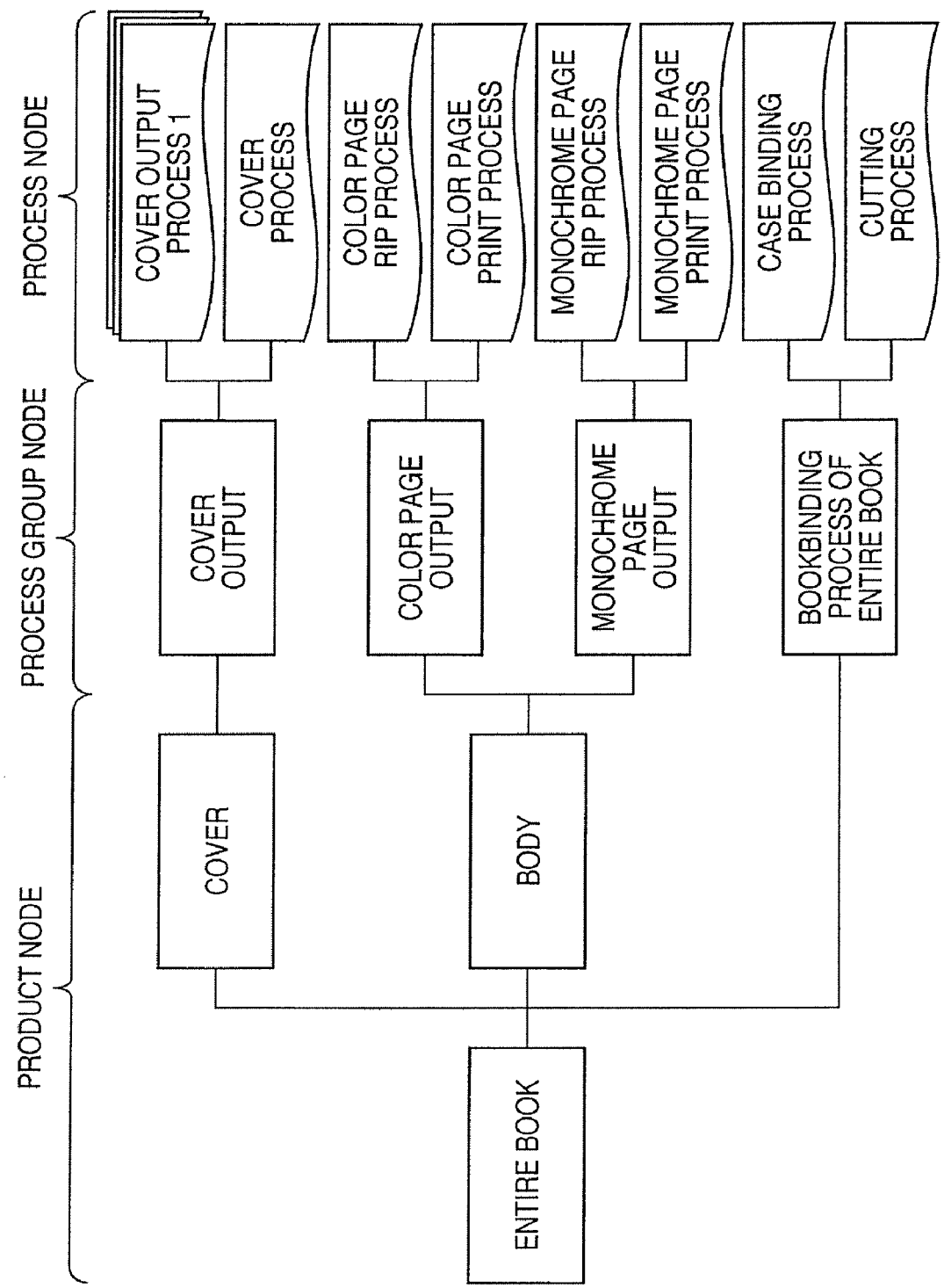
FIG. 6 is a hierarchical view showing an example of bookbinding using JDF (Job Definition Format)

FIG. 6 is a hierarchical view showing an example of bookbinding using JDF (Job Definition Format).

"Entire book" to be delivered to an end user is created through various processes to prepare a cover, prepare a body, and bind them.

In the JDF, a process to create a physical output material in forming an output material is called a product node, and a process to create a product node is called a process node. In addition, a group of process nodes serving as elements on the intermediate stage for creating a product node is called a process group node.

In the example of FIG. 6, an entire book is formed by case-binding and cutting a cover and body. A product node "cover" includes one process group node "cover output". The process group node "cover output" includes a process node "cover output process 1" to print out a cover, and a "cover process" to perform a surface treatment such as laminating or varnishing for an output material.

Similarly, a product node "body" includes process group nodes "color page output" and "monochrome page output". Each process group node includes corresponding process nodes "page RIP process" and "page print process".

"Cover" and "body" are bound using a process group node "bookbinding process of entire book". The process group node "bookbinding process of entire book" includes process nodes "case binding process" and "cutting process".

The JDF file describes these pieces of node information and attribute information. An information processing apparatus called a JDF manager creates and changes a JDF file.

An information processing apparatus called a JDF worker receives a JDF file from the JDF manager, and performs necessary operations on the basis of information described in the JDF file.

[MIS Server and Process Management Workflow]

The MIS (Management Information System) server 201 (FIG. 2) is one of main functions of the process management section. The MIS server 201 is a system server called a management information system or business management system which collects and analyzes information necessary to decision making of business management and the like.

The MIS server 201 is generally a server in a system which comprehensively manages various kinds of management information and sales information for advertisement, order reception, estimation, planning, production, shipping, inventory, purchase, and marketing. Especially the MIS server 201 in the printing industry functions as the server of a print production process management system. The MIS server 201 unifies the management of the print production equipment and print production resources. The MIS server 201 can provide a mechanism to automate the total workflow from order reception to delivery or cost recovery using a job ticket describing work instructions of a JDF job.

The MIS server 201 is a server computer serving as the core of the business management system. The MIS server 201 issues a JDF describing work instructions of a job for processes in the POD site environment on the basis of job designation from an end user. The JDF controls the workflow of the system including computers and various devices.

The MIS server 201 exchanges so-called JMF (Job Messaging Format) messages with processes in the POD site environment. The MIS server 201 centralizes the system workflow by acquiring function information and capability information of each device, status information of each device, progress information of an accepted job, and the like.

The MIS server 201 incorporates a process management function typified by a workflow editor or workflow engine, or a scheduler function of managing the time schedule of jobs and devices. The MIS server 201 cooperates with an application or the like having these functions. The MIS server 201 can compose work of each process into a workflow to designate execution of the work. Also, the MIS server 201 can efficiently schedule work by each device or each operator to automate the workflow of each process.

In many cases, these functions of the MIS server 201 require a user ID, password, or the like, or are managed as application software by a license. This is because various operators such as a business manager, a process manager (engineer), an operator on site, and a salesperson who prepares an estimate refer to data using different client PCs.

[Mechanism of Order Receiving Server]

The order receiving server 202 (FIG. 2) mediates so-called EC (Electronic Commerce) in POD. The order receiving server 202 receives/places an order of a job from a client PC in the end user environment via a communication medium such as the Internet. When viewed from the end user environment, the order receiving server 202 is an e-shop using a Web page on the Internet.

For example, when a job, an order of which is to be placed, is a print job, the end user performs user authentication from the browser of a client PC in the end user environment. Then, the end user inputs print condition settings which designate print conditions to output a job, another print request information, and the like. The client PC in the end user environment sends a document/image file to be printed as electronic data to the order receiving server 202 via the Internet together with the print condition settings, print request information, and the like. The order receiving server 202 functioning as a Web server receives the order of the print job.

It is also possible to apply a hot folder to the order receiving server 202 or each client PC in the end user environment and transfer a document/image file to be printed, accessory print condition settings, another print request information, and the like.

The hot folder is a virtual folder containing print condition settings, another print request information, and the like as attributes. A plurality of hot folders are creatable in a memory (not shown) such as the hard disk of the order receiving server or each client PC in the end user environment.

For example, an end user drags and drops a print-requested document/image file from each client PC in the end user environment to a hot folder. Then, the monitoring program of the order receiving server 202 or the client PC in the end user environment recognizes the presence of the document/image file. Print condition settings, another print request information, and the like accessory to the hot folder are associated with each other, allowing the order receiving server to read out the pieces of information.

When a job, an order of which is to be placed, is a copy job, the end user sends a paper manuscript to be copied as a physical medium by a home delivery service or the like, instead of sending a document/image file as electronic data. The end user inputs, from the browser of a client PC in the end user environment, only copy condition settings which designate copy conditions to output a job, and another copy request information. In this case, the operator determines the association between the received paper manuscript to be copied, and the copy condition settings, copy request information, and the like sent to the order receiving server.

[Order Reception/Placement Workflow]

Figure 7:
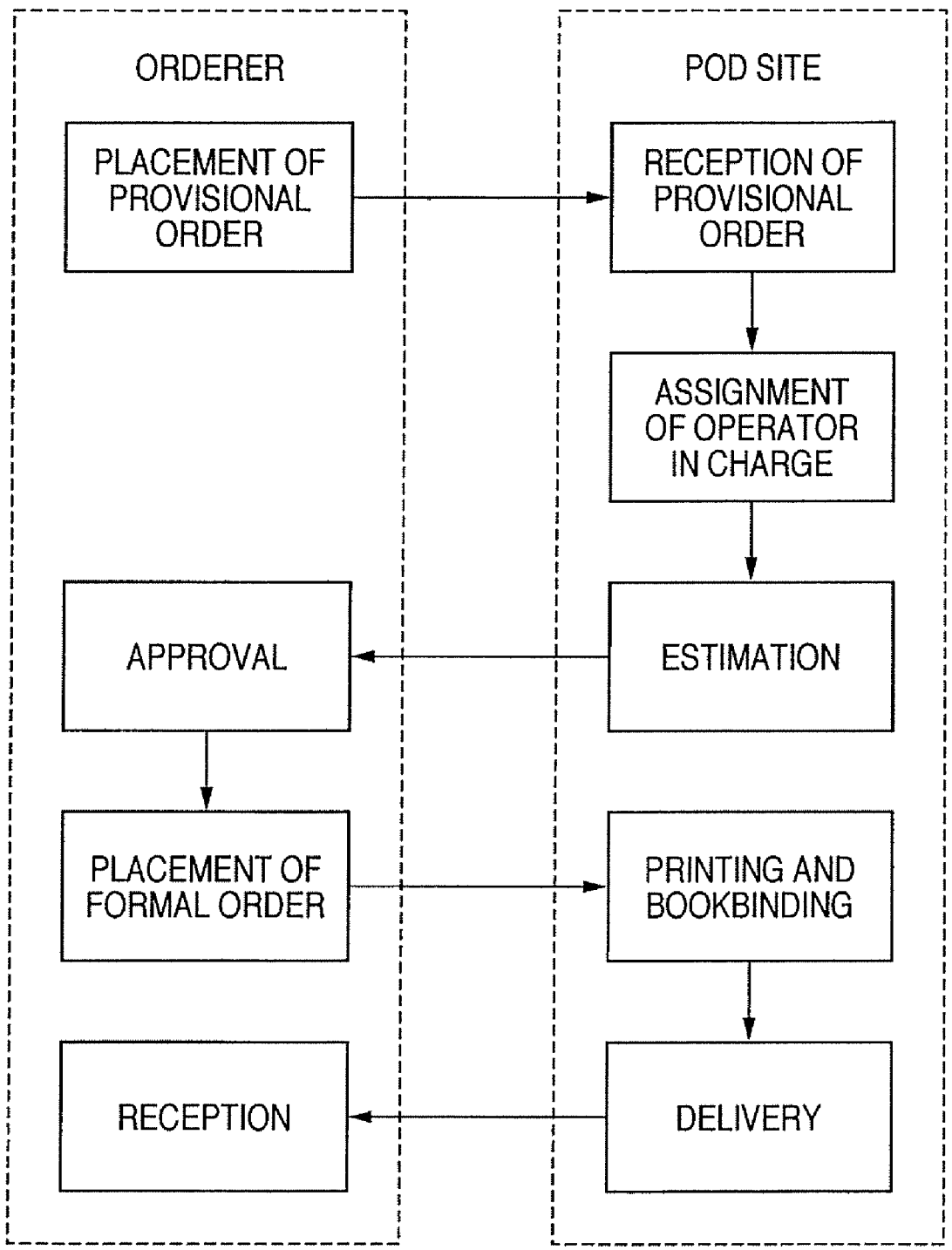
FIG. 7 is a view showing an example of a workflow in receiving/placing an order of a job from an end user.

FIG. 7 is a view showing an example of a workflow in receiving/placing an order of a job from an end user.

The left block in FIG. 7 represents work by an orderer who is an end user, and the right block represents work by an operator on the POD site.

The orderer places a provisional order to the order receiving server on the POD site using a Web page on the Internet.

For example, when a job, an order of which is to be placed, is a print job, the end user performs user authentication from the browser of a client PC in the end user environment. Then, the end user inputs print condition settings which designate print conditions to output a job, another print request information, and the like. The client PC in the end user environment sends a document/image file to be printed as electronic data to the order receiving server via the Internet together with the print condition settings, print request information, and the like. The order receiving server 202 functioning as a Web server receives the provisional order of the print job.

When a job, an order of which is to be placed, is a copy job, the end user sends a paper manuscript to be copied as a physical medium by a home delivery service or the like, instead of sending a document/image file as electronic data. The end user inputs, from the browser of a client PC in the end user environment, only copy condition settings which designate copy conditions to output a job, and another copy request information. In this case, the operator determines the association between the received paper manuscript to be copied, and the copy condition settings, copy request information, and the like sent to the order receiving server.

Upon receiving the provisional order from the orderer, the order receiving server 202 on the POD site executes processes such as acceptance and save of the provisionally received job. At the same time, the order receiving server 202 or MIS server 201 assigns an operator in charge.

The operator in charge can be assigned by various methods. For example, the scheduler of the order receiving server 202 may automatically assign an operator in charge. The manager of operators may manually assign a proper operator in charge. Alternatively, each operator may process a provisionally received job.

The order receiving server 202 or MIS server 201 on the POD site estimates the cost of the provisionally received job. In estimation, the order receiving server 202 or MIS server 201 refers to print conditions, copy conditions, or the like input by the orderer in placing the provisional order. The order receiving server 202 or MIS server 201 calculates the total cost based on the estimate of the costs of work and resources necessary for a job, and expenses such as the delivery fee. The order receiving server 202 or MIS server 201 presents the estimated cost to the orderer.

When presented with the estimated amount, the orderer obtains an approval from the administrator, and places a formal order to the order receiving server on the POD site. In placing the formal order, the orderer can also change the print conditions or copy conditions of the provisionally ordered job or the like.

Upon receiving the formal order from the orderer, the order receiving server on the POD site executes various processes such as printing and bookbinding for the formally received job using process management, and prepress, digital printing, and postpress.

After the end of various processes such as printing and bookbinding on the POD site, the order receiving server delivers a final product (printed material) to a delivery destination designated in advance by the orderer. As a result, the orderer receives the final product (printed material).

[Job Ticket-Based Workflow]

Figure 8:
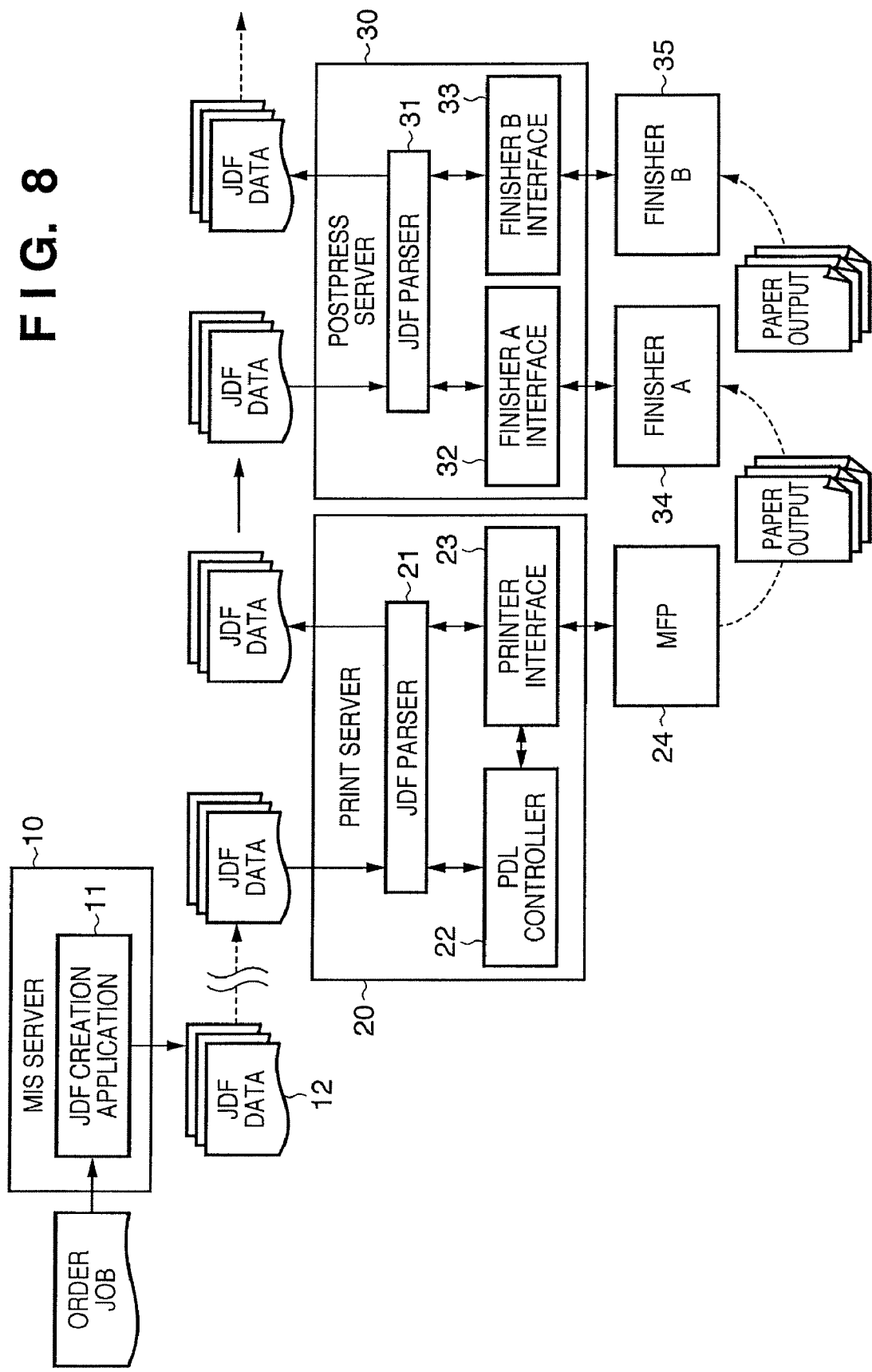
FIG. 8 is a view showing an example of a workflow implemented by a job ticket.

FIG. 8 is a view showing an example of a workflow implemented by a job ticket.

FIG. 8 shows an example of a printing system implemented by JDF data serving as management information (job management information) of various processes (jobs) including the press process and various postpress processes.

In FIG. 8, a MIS server 10 is a system which manages the workflow of the whole system from reception of an order to delivery, and comprehensively manages various kinds of management information and sales information. The MIS server 10 incorporates a JDF (Job Definition Format) creation application 11 for creating JDF data 12 corresponding to a job ticket which describes a work instruction in the workflow.

A print server 20 receives a job input to an MFP 24 serving as the digital printing section, and manages and controls the overall MFP 24. The print server 20 comprises a JDF parser 21 for interpreting JDF data, a PDL controller 22 for processing various PDL data such as PDF/PS, and a printer interface 23 for connecting the print server 20 to a printer engine such as the MFP.

A postpress server 30 receives a job input to a finisher serving as the postpress section, and manages the overall finisher. The postpress server 30 comprises a JDF parser 31 for interpreting JDF data, and a finisher interface for connecting at least one finisher (post-processing apparatus)

In the example of FIG. 8, the postpress server 30 comprises a finisher A interface 32 and finisher B interface 33 for connecting the postpress server 30 to a finisher A 34 and finisher B 35, respectively. The postpress server 30 adopts finisher interfaces by the number of necessary finishers.

The job ticket-based workflow is implemented as follows.

When an order job is input to the MIS server 10, the operator uses the JDF creation application 11 installed in the MIS server 10 to create JDF data 12 equivalent to a job ticket which describes a work instruction in the workflow.

When the print server 20 receives the created JDF data 12, the JDF parser 21 of the print server 20 interprets the JDF data, and executes a job to the MFP 24. For example, the JDF data designates attributes such as the output paper size, single/double-sided printing, and N-up. In accordance with the contents of the JDF data, the PDL controller 22 processes PDL data such as PDF/PS to be referred to by the JDF data. The PDL controller 22 causes the MFP 24 via the printer interface 23 to print.

When the postpress server 30 receives the JDF data created by the print server 20, the JDF parser 31 of the postpress server 30 interprets the JDF data, and causes the finisher to execute the job. For example, the JDF data designates attributes such as case binding, saddle stitching, and cutting. In accordance with the contents of the JDF data, the JDF parser 31 causes the finisher A 34 and finisher B 35 via the finisher A interface 32 and finisher B interface 33 to execute post-processes (postpress processes).

[Mechanism of File Server]

The file server 203 saves customer information (name, contact address, and the account number of a credit card or the like) of an end user, a received job, and the like in preparation for a reorder of the same manuscript from the end user. A job contains a document/image file to be printed, accessory print condition settings, another print request information, and the like. Also, a job contains a scanned image file obtained by scanning a paper manuscript to be copied, accessory copy condition settings, another copy request information, and the like.

Saved information is used to, e.g., quickly deal with a reprint request by reading out, collating, and referring to customer information, a previous job, and the like.

The file takes the form of application file data, PDL data, print ready data, or intermediate data of them. One or a plurality of such files can be saved in accordance with application purposes.

Print ready data is, e.g., data after RIP, and is a bitmap file or a compressed file such as a Tiff file. Intermediate data (e.g., display list) is not a final output, but exists between PDL data and print ready data.

Print ready data to be saved is large-volume data, so print ready data is stored in another storage medium (e.g., CD-ROM, MO, or ZIP). Similarly, old or large-volume PDL data is saved in another medium. Print ready data can also be sent back together with a final output if the user desires so.

In this manner, every time the end user requests reprinting, the file server controls to read out user's job data from a storage medium and print it again under desired printout conditions.

The user may restore saved data and request reprinting of it. For example, the document/image file of a print job received by the order receiving server 202 from a client PC in the end user environment can be stored as an original manuscript in a memory unit such as the hard disk of the file server 203, and held for a predetermined time. When the end user places a reorder of a print job based on the same manuscript, the file server can process the reorder without causing him to transmit the document/image file again.

After scanning the paper manuscript of a copy job received from an end user and receiving the image as a scanned image file, the scanned image file is stored in a memory unit such as the hard disk of the file server 203, and held for a predetermined time. When the end user places a reorder of a copy job based on the same manuscript, the file server can process the reorder without causing him to send the paper manuscript again.

A print job or copy job undergoes the print process in an output form (e.g., print condition settings and another print request information, or copy condition settings and another copy request information) desired by an end user. After that, an unprinted final document/image file edited and processed by an operator, or final print data having undergone the print process is stored in a memory unit such as the hard disk of the file server 203, and held for a predetermined time. This can reduce post-process work when receiving a reorder from an end user.

[Ordering Form from Customer]

Generally in placing an order with the printing system, the orderer designates not details of the bookbinding process but only a rough creation form. For example, the customer designates print manuscript data and bookbinding information (e.g., the number of copies, delivery time setting, paper size, cover setting, binding style, single/double-sided printing, and color profile information for use). Then, the customer requests the estimate of the order receiving server 202.

The bookbinding information is called product intent information and described at a product node.

The order receiving server 202 transmits product intent information to the MIS server 201. The MIS server 201 transmits the product intent information to the prepress server 302, print server 401, and postpress server 501.

Upon receiving the product intent information, each server converts the product node into a process node indicating a concrete process by referring to the load status of the JDF worker managed by the server, the resource status of paper, ink, and the like, and executable functions.

A product node is not converted into a unique process node, and various conversion results are obtained in accordance with the state and capability of the JDF worker. For example, when creating an A4-size bound product, the JDF worker capable of achieving the process, and the workflow change depending on whether to bind A4-size sheets or to fold and cut A3-size sheets.

The MIS server 201 combines process nodes into the workflow of the whole print process. The MIS server 201 estimates the delivery date and fee from the print workflow. If necessary, the MIS server 201 creates a sample of a printed material and presents it to the customer.

The customer checks the sample, and if reaching an agreement on the delivery time and the amount of money, places a formal order.

Upon receiving the order, the MIS server 201 performs printing and bookbinding by executing processes on the basis of the workflow built in estimation.

A job ticket describing intent nodes and process nodes used in the processes is saved for preparation of reprinting.

[Gang Job Printing]

Gang job printing (merged job printing) is one form of printing. Gang job printing is to lay out and print a plurality of print jobs on one sheet. In commercial printing, a plate is created to print. Laying out jobs on one plate surface can reduce the cost of plate preparation per job. Color processes and print sheets are uniform in printing, but this can reduce the printing cost per job. Printed sheets are cut by a cutter for each job, and delivered to the customer.

[Cutting Process]

In the cutting process, the cutter cuts sheets along printer's marks (offcut position marks (cutting lines)) on them. A layout area for gang job printing is generally complicated. While moving and rotating a sheet, the operator cuts it along cutting lines for each job in accordance with the layout of images printed on the sheet by gang job printing.

First Embodiment

A printing and bookbinding system according to the first embodiment of the present invention will be explained with reference to FIG. 9A.

FIG. 9A is a view showing an example of the configuration of the printing and bookbinding system according to the first embodiment of the present invention.

The printing and bookbinding system shown in FIG. 9A is built from especially elements associated with the first embodiment in the configuration of the printing and bookbinding system shown in FIG. 1. In FIG. 9A, the printing and bookbinding system comprises client PC 901s, a MIS server 903, a prepress server 910, a device 904, and a cutter 908.

The MIS server 903 receives a request (job 902) from the client PC 901 of a user. The MIS server 903 sequentially transmits received jobs (or gang job) to the prepress server 910. The prepress server 910 executes the layout process to print the received job 902 on a print sheet, and the cutting procedure decision process to set cutting lines on a print sheet on which jobs are laid out, and to set cutting procedures. The prepress server 910 transmits print data generated by the layout process and cutting procedure decision process to the device 904.

The prepress server 910 is connected to a device information DB (DataBase) 905 and operator DB (DataBase) 906. The device information DB 905 manages information on devices such as the cutter 908 and device 904, whereas the operator DB 906 manages information on operators who perform the cutting process. The prepress server 910 can refer to each DB as needed.

The device 904 prints jobs (manuscript data) and cutting lines on the basis of print data received from the prepress server 910. A post-processing apparatus for an output material 907 of jobs from the device 904 is arranged on the outside of the device 904. As the post-processing apparatus, the cutter 908 is arranged to perform the cutting process. The cutter 908 cuts the output material 907 of jobs into output materials 909 of the respective jobs. While rotating the orientation of a target output material (printed sheets), the operator cuts it with the cutter 908 along cutting lines printed on the output material.

In the printing and bookbinding system according to the first embodiment, for example, a data file created by a general application in the prepress server 910 (or client PC 901) is converted into an electronic manuscript file by an electronic manuscript writer. A bookbinding application (imposition application) provides a function of editing the electronic manuscript file.

In this example, the functions of the general application, the electronic manuscript writer, the bookbinding application, an electronic manuscript despooler, and the like are separated to clarify various functions implemented by the printing and bookbinding system. However, a package provided to the user is not limited to these. For example, these functions may be provided as an application or graphic engine which combines them.

<Example of Software Configuration of Printing and Bookbinding System>

Figure 9B:
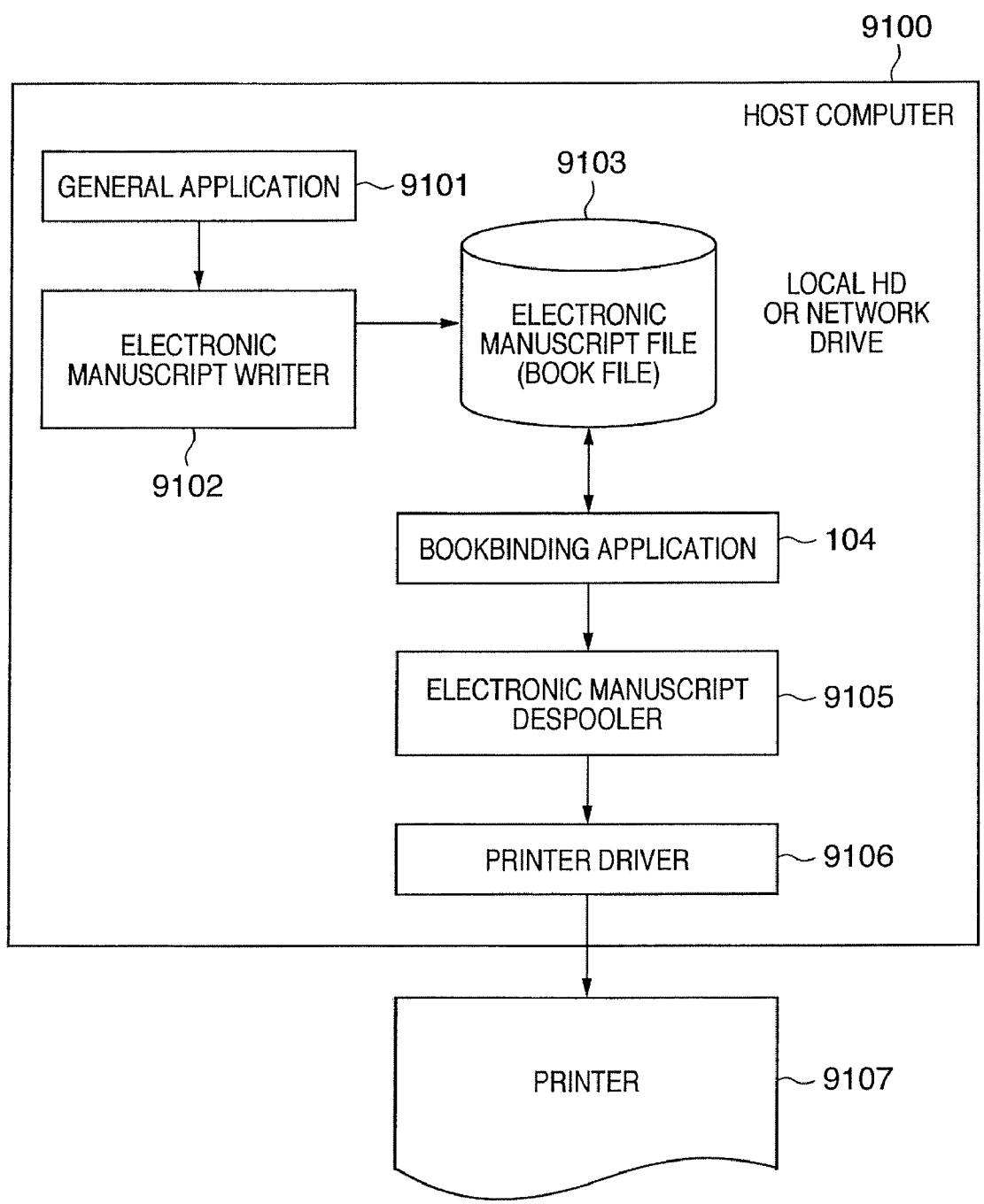
FIG. 9B is a block diagram showing the software configuration of the printing and bookbinding system according to the first embodiment of the present invention.

FIG. 9B is a block diagram showing the software configuration of the printing and bookbinding system according to the first embodiment of the present invention. The following description pays attention to the relationship between a computer 9100 (prepress server 910) and the device 904 (printer 9107) as main elements of the first embodiment.

The printing and bookbinding system is implemented by the computer 9100 (to be also referred to as a host computer hereinafter) as a preferred embodiment of a document processing apparatus (information processing apparatus) of the present invention. The computer 9100 typically corresponds to the prepress server 910. However, any of various servers (e.g., MIS server) and client PCs in the printing and bookbinding system can also function as the computer 9100 as far as the device can input print data to the device 904 (e.g., MFP) which finally prints. Alternatively, a controller which controls a device can also function as the computer 9100.

A general application 9101 is an application program which provides various functions such as wordprocessing, spreadsheet, photo retouch, draw or paint, presentation, text edit, and the like. The general application 9101 has a print function for an OS (Operating System) which runs on the computer 9100. The general application 9101 uses a predetermined interface provided by the OS upon printing application data such as created document data, image data, and the like. The predetermined interface is called a GDI (Graphical Device Interface) in general.

That is, an arbitrary general application 9101 sends output commands (called GDI functions) of a predetermined format depending on the OS to an output module (not shown) of the OS that provides a predetermined interface so as to print created data. Upon receiving the output commands, the output module converts the output commands into a format processible by an output device such as a printer, and outputs the converted commands (called DDI: Device Driver Interface functions).

Since the format processible by the output device changes depending on the types and vendors, models, and the like of devices, a device driver for controlling a device is provided for each device. The OS generates print data by converting the commands using that device driver, and bundles it with a JL (Job Language), thus generating a print job. When Microsoft Windows is used as the OS, a module called GDI (Graphic Device Interface) corresponds to the aforementioned output module.

An electronic manuscript writer 9102 is a software module which is prepared by improving the aforementioned device driver, and is provided to implement the printing and bookbinding system. However, the electronic manuscript writer 9102 does not intend any specific output device, and converts the output commands into a format processible by a bookbinding application 104 and printer driver 9106 (to be described later).

The format after conversion by the electronic manuscript writer 9102 (to be referred to as an "electronic manuscript format" hereinafter) is not particularly limited as long as it can express a manuscript for each page using a detailed form. Of practical standard formats, for example, a PDF format of Adobe Systems, U.S.A., an SVG (Scalable Vector Graphics) format published by W3C, U.S.A., and the like can be adopted as the electronic manuscript format.

When the general application 9101 uses the electronic manuscript writer 9102, it designates the electronic manuscript writer 9102 as a device driver used in output, and then executes printing. However, an electronic manuscript file itself generated by the electronic manuscript writer 9102 does not have a perfect format as an electronic manuscript file.

For this reason, the bookbinding application 104 designates the electronic manuscript writer 9102 as a device driver, and application data is converted into an electronic manuscript file under the control of the bookbinding application 104. The bookbinding application 104 completes a new, imperfect electronic manuscript file generated by the electronic manuscript writer 9102 as an electronic manuscript file having a format to be described later.

In the following description, when this difference must be clearly identified, a file created by the electronic manuscript writer 9102 will be referred to as an electronic manuscript file, and an electronic manuscript file to which a structure is given by the bookbinding application 104 will be referred to as a book file. Also, when these files need not be especially distinguished from each other, all of a document file, electronic manuscript file, and book file generated by the application will be referred to as a document file (or document data).

In this way, the general application 9101 prints its application data by designating the electronic manuscript writer 9102 as a device driver. As a result, the application data is converted into an electronic manuscript format which includes pages (to be referred to as "logical pages" or "manuscript pages" hereinafter) defined by the general application 9101 as a unit. The application data in this electronic manuscript format is stored in a storage medium such as a hard disk or the like as an electronic manuscript file 9103.

Note that the hard disk may be a local drive of a computer which implements the printing and bookbinding system of the first embodiment, or may be a drive provided on a network when the system connects to the network.

When the general application 9101 itself has a capability of generating data in the electronic manuscript format, it need not execute printing by designating the electronic manuscript writer 9102. In this case, the application data of the electronic manuscript format generated by the general application 9101 itself can be converted into an electronic manuscript file under the control of the bookbinding application 104.

The bookbinding application 104 provides the user with functions of loading the electronic manuscript file or book file 9103, and allowing the user to edit the loaded file.

When printing the book file 9103 edited by the bookbinding application 104, the bookbinding application 104 launches an electronic manuscript despooler 9105. The electronic manuscript despooler 9105 is a program module installed in the computer together with the bookbinding application 104. The electronic manuscript despooler 9105 is a module used to output rendering data to the printer driver 9106 in printing a document (book file) used by the bookbinding application 104.

The electronic manuscript despooler 9105 reads out the designated book file 9103 from the hard disk. The electronic manuscript despooler 9105 generates output commands suited to the output module of the OS so as to print respective pages in a format described in the book file 9103. Then, the electronic manuscript despooler 9105 outputs the generated commands to the output module. At this time, the electronic manuscript despooler 9105 designates, as a device driver, the printer driver 9106 of the printer 9107 used as the output device. The output module converts the received output commands into device commands that can be interpreted by the printer 9107 using the printer driver 9106 of the designated printer 9107. The device commands are sent to the printer 9107, which prints images according to the device commands on print sheets.

<Example of Hardware Configuration of Printing and Bookbinding System>

FIG. 9C is a block diagram showing the hardware configuration of the printing and bookbinding system according to the first embodiment of the present invention.

Referring to FIG. 9C, the host computer 9100 comprises a CPU 9201. The CPU 9201 executes processes based on programs such as a document processing program (application program), print process-related program, and the like stored in a program ROM 9203b of a ROM 9203 or an external memory 9211. These processes include a document process containing any combinations of elements such as graphics data, image data, text data, and table data (including a spreadsheet). Furthermore, the CPU 9201 systematically controls respective devices connected to a system bus 9204 in the host computer 9100.

The program RON 9203b of the ROM 9203 or the external memory 9211 also stores programs such as an operating system program (to be referred to as an OS hereinafter) as a control program of the CPU 9201. A font ROM 9203a of the ROM 9203 or the external memory 9211 stores data such as font data used in the document process. A data ROM 9203c of the ROM 9203 or the external memory 9211 stores various data used to execute various processes such as the document process.

Reference numeral 9202 denotes a RAM which serves as a main memory, work area, and the like of the CPU 9201. Reference numeral 9205 denotes a keyboard controller (KBC) which controls key inputs from a keyboard (KB) 9209 and command inputs from a pointing device (not shown). Reference numeral 9206 denotes a CRT controller (CRTC) which controls display on a CRT display (CRT) 9210. Note that an LCD controller and LCD may be used in place of the CRT controller 9206 and CRT display 9210.

Reference numeral 9207 denotes a disk controller (DKC) which controls access to the external memory 9211 such as a hard disk (HD) or Floppy® disk (FD). The external memory 9211 stores various data such as a boot program, various applications, font data, user files, edit files, and a print control command generation program (to be referred to as a printer driver hereinafter).

Reference numeral 9208 denotes a printer controller (PRTC) which is connected to the printer 9107 via a predetermined two-way interface (interface) 921, and executes a communication control process with the printer 9107. Examples of the two-way interface include a USB interface, IEEE1394 interface, and wireless LAN interface.

Note that the CPU 9201 executes the rasterization process of outline font data onto a display information RAM allocated in, e.g., the RAM 9202, thus allowing WYSIWYG on the CRT 9210. Also, the CPU 9201 opens various registered windows on the basis of commands designated by a mouse cursor (not shown) or the like on the CRT 9210, and executes various data processes. In printing, the user opens a window (operation window) that pertains to print settings, and can make settings of a print method for the printer driver, which includes printer settings and print mode selection.

In the printer (printing device) 9107, reference numeral 9312 denotes a printer CPU. The printer CPU 9312 systematically controls respective devices connected to a system bus 9315 in a printer controller 1000. The printer CPU 9312 outputs an image signal as output information to a printer engine 9317 via a printer engine interface (I/F) 9316. Note that this output is based on a program such as a control program stored in a program ROM 9313b of a ROM 9313 or an external memory 9314.

The program ROM 9313b of the ROM 9313 stores programs such as the control program of the printer CPU 9312. A font ROM 9313a of the ROM 9313 stores data such as font data used to generate the output information. In the case of a printer having no external memory 9314 such as a hard disk (HD) or IC card, a data RON 9313c of the ROM 9313 stores information and the like used on the host computer 9100.

The printer CPU 9312 can execute a communication process with the host computer 9100 via an input unit 9318, and can notify the host computer 9100 of various kinds of information such as status information in the printer 9107. Reference numeral 9319 denotes a RAM serving as a main memory, work area, and the like of the printer CPU 9312. The RAM 9319 can expand its memory capacity by an optional RAM connected to an expansion port (not shown).

Note that the RAM 9319 can also be used as an output information rasterization area, environmental data storage area, NVRAM, or the like. A memory controller (MC) 9320 controls access to the external memory 9314. The external memory 9314 is connected as an option, and stores data such as font data, emulation programs, and form data. Reference numeral 9321 denotes an operation unit with an operation panel, switches, LED indicators, and the like required to implement various operations to the printer 9107.

The number of external memories 9314 is not limited to one, and at least one external memory 9314 may be connected. Also, a plurality of external memories including an optional font card in addition to built-in font data, and an external memory which stores a program to interpret a printer control language of a different language system may be connected. Furthermore, the printer may comprise an NVRAM (not shown), and may store printer mode setting information from the operation unit 9321.

[Outline of System Process Sequence]

Digital printing is much lower in plate preparation cost than gang job printing by conventional printing.

The print process rarely depends on the layout, but the cutting procedures of the cutting process change depending on the layout. As the cutting procedures become complicated, the number of cutting lines and the number of times of rotation in cutting increase.

To calculate the cutting cost, the present invention adopts the cutting difficulty obtained from the number of cutting lines and the number of times of rotation. First, an outline of the process of the printing and bookbinding system according to the first embodiment will be explained with reference to FIG. 10.

Since cutting is repeated by the number of cutting lines, the number of cutting lines is generally equal to the number of times of cutting. However, some cutting methods cut a sheet along a plurality of cutting lines at once. The number of cutting lines is not always equal to the number of times of cutting, and the number of times of cutting may be different (smaller in general) from the number of cutting lines. However, the cutting difficulty is not so different between a case in which the cutting difficulty is based on the number of cutting lines and a case in which it is based on the number of times of cutting. Hence, cutting difficulty based on the number of cutting lines will be exemplified. When a stricter cutting difficulty is necessary, cutting difficulty with reference to the number of times of cutting based on the number of cutting lines is also available.

Figure 10:
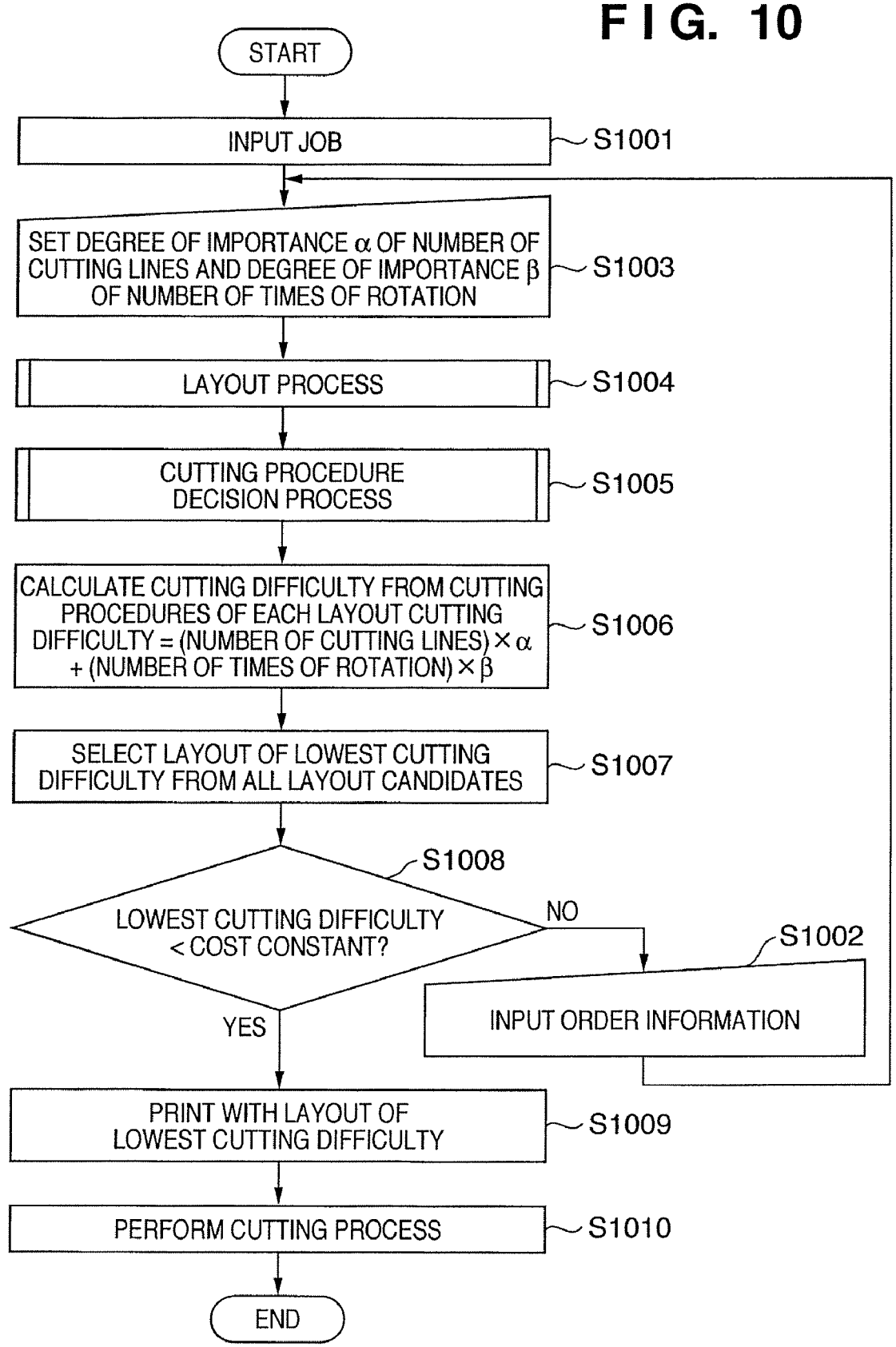
FIG. 10 is a flowchart showing the process of the printing and bookbinding system according to the first embodiment of the present invention.

FIG. 10 is a flowchart showing the process of the printing and bookbinding system according to the first embodiment of the present invention.

More specifically, this operation is implemented by arithmetic processes executed by CPUs incorporated in the client PC 901, MIS server 903, prepress server 910, device 904, and cutter 908 on the basis of programs stored in their memories. The operation will be explained using the names of the devices (client PC 901, MIS server 903, prepress server 910, device 904, and cutter 908) for easy understanding of main processors of the operation.

In step S1001, the prepress server 910 receives the job 902 issued from the client PC 901 of a user via the MIS server 903.

In step S1002, the user inputs order information including the cost and delivery time via the client PC 901 at the same time as the job. The user may input the order information via the prepress server 910.

In step S1003, the user sets, via the client PC 901, which of the number of cutting lines and the number of times of rotation to a print sheet is more important in cutting settings for the job 902. For example, the user can make the setting via a cutting setup window (FIG. 16) displayed on the monitor of the client PC 901. The prepress server 910 receives setting information input via the cutting setup window. The prepress server 910 decides the level of importance (coefficient) $\alpha$ of the number of cutting lines and the level of importance (coefficient) $\beta$ of the number of times of rotation on the basis of the received setting information.

In step S1004, the prepress server 910 communicates with the device information DB 905 and operator DB 906 to acquire information on the cutter 908 and the operator. The prepress server 910 performs the layout process to lay out received jobs (manuscript data) on a print sheet. Details of the layout process will be described later. By the layout process, the prepress server 910 decides layout candidates.

In step S1005, the prepress server 910 executes the cutting procedure decision process to decide the cutting procedures of each layout candidate decided in step S1004. Details of the cutting procedure decision process will be described later.

In step S1006, the prepress server 910 calculates the cutting difficulty of each layout candidate on the basis of the coefficients $\alpha$ and $\beta$ decided in step S1003 and the cutting procedures decided in step S1005. As the measure, the number of cutting lines and the number of times of rotation of a print sheet in the cutting process are employed. More specifically, the prepress server 910 calculates the cutting difficulty= (the number of cutting lines)$\times\alpha$+(the number of times of rotation)$\times\beta$.

In step S1007, the prepress server 910 selects a layout of the lowest cutting difficulty from all layout candidates.

In step S1008, the prepress server 910 compares a cost constant obtained from the order information set in step S1002 with the lowest cutting difficulty of the layout selected in step S1007. If the cost constant is larger than the lowest cutting difficulty (YES in step S1008), the prepress server 910 generates print data on the basis of the selected layout, and outputs it to the device 904. If the cost constant is equal to or smaller than the lowest cutting difficulty (NO in step S1008), the process advances to step S1002 to input conditions again.

Print data generated by the prepress server 910 is data to lay out a plurality of jobs in a decided layout and print set cutting lines and cutting order numbers representing the cutting order.

In step S1009, the device 904 prints the print data on the basis of print setting information (layout of the lowest cutting difficulty) set in the print data received from the prepress server 910.

In step S1010, the cutter 908 cuts a material printed in step S1009 along the layout and cutting lines. The cut output material 909 is delivered to the user, and the process ends. When the printed material is to undergo a post-process by an offline finisher, the operator sets the printed material in the cutter 908 and executes a cutting process requiring the intervention of an operator's operation (rotation of a print sheet).

[Layout Process]

Details of the layout process in step S1004 of FIG. 10 will be explained with reference to FIGS. 11A and 11B.

Figure 11A:
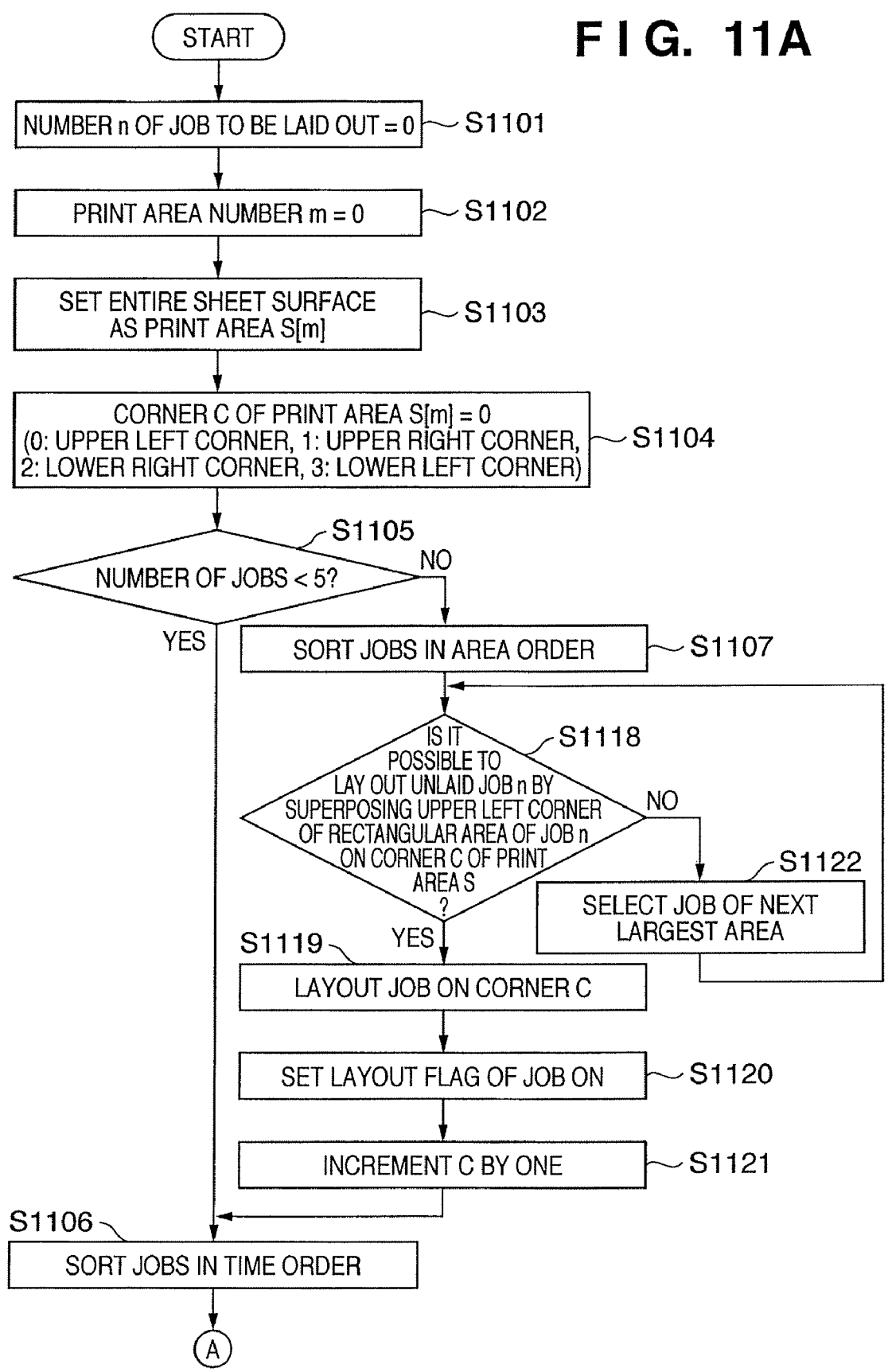
FIGS. 11A and 11B are flowcharts showing details of the layout process according to the first embodiment of the present invention.
Figure 11B:
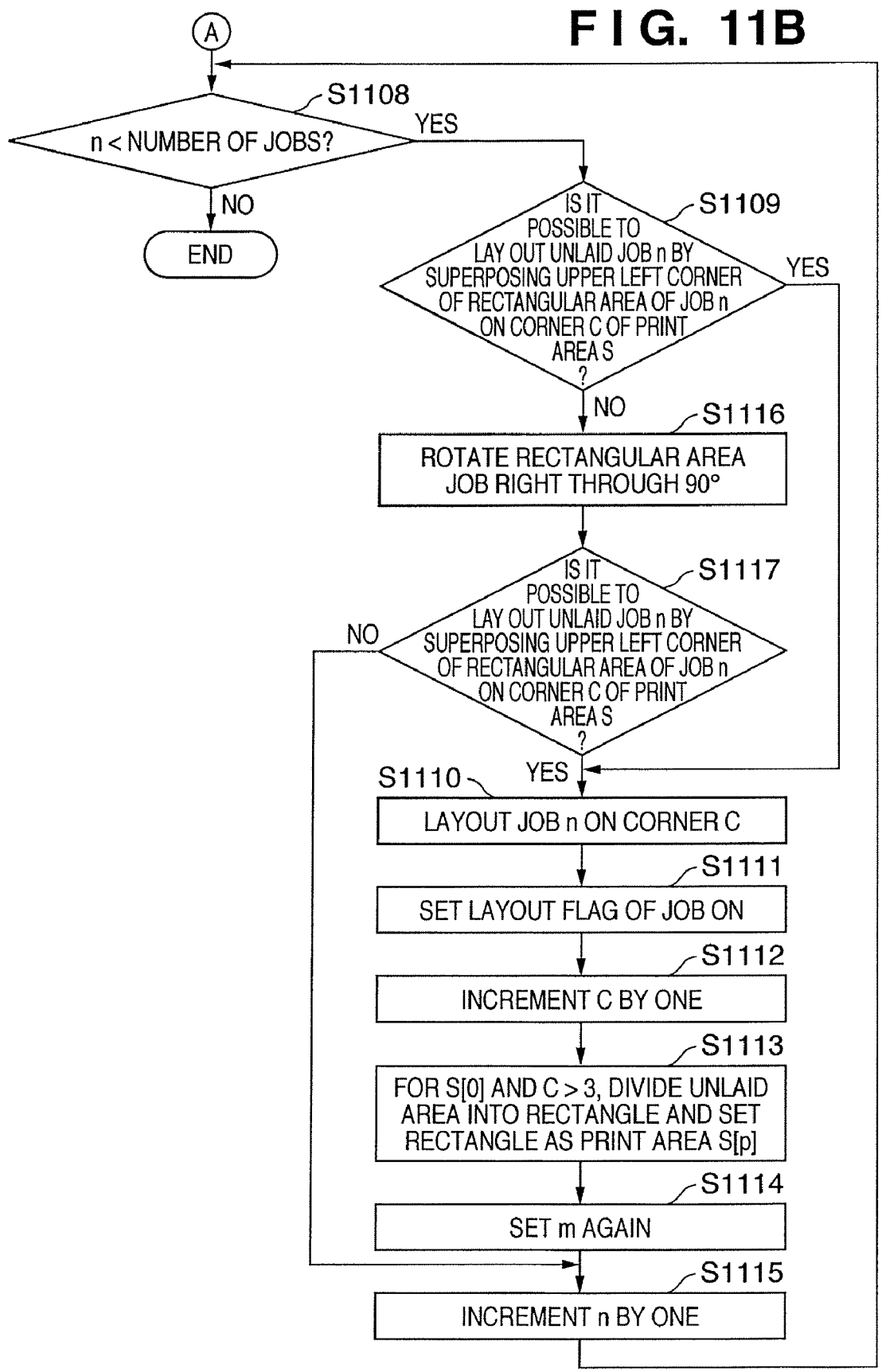

FIGS. 11A and 11B are flowcharts showing details of the layout process according to the first embodiment of the present invention.

More specifically, this operation is implemented by an arithmetic process executed by the CPU 9201 on the basis of the program of the bookbinding application 104. For easy understanding, this operation will be explained as that of the bookbinding application 104.

In step S1101, the bookbinding application 104 initializes, to 0, n representing the number of a job (job number) to be laid out. In step S1102, the bookbinding application 104 initializes, to 0, the variable m (print area number) representing a print area where a job is laid out on a print sheet.

In step S1103, the bookbinding application 104 sets the entire sheet surface as the print area S[m]. In step S1104, the bookbinding application 104 sets, to 0 representing the upper left corner, C representing the corner of a print area (printable area) where a job is laid out on a print sheet. In this case, C=0, 1, 2, and 3 represent the upper left, upper right, lower right, and lower left corners of a rectangular print area, respectively.

In step S1105, the bookbinding application 104 branches the subsequent layout process depending on the number of jobs. As the number of jobs increases, the number of calculation operations increases to influence the performance. Several jobs (manuscript pages) are laid out according to predetermined rules. If the number of jobs is smaller than 5 (YES in step S1105), the process advances to step S1106. If the number of jobs is equal to or larger than 5 (NO in step S1105), the process advances to step S1107.

A case in which the number of jobs is smaller than 5 will be described.

In step S1106, the bookbinding application 104 sorts jobs in the input time order. In step S1108, the bookbinding application 104 determines whether the job number n is smaller than the number of jobs. If the job number n is smaller than the number of jobs (YES in step S1108), the process advances to step S1109. If the job number n is equal to or larger than the number of jobs (NO in step S1108), the layout process ends.

In step S1109, the bookbinding application 104 determines whether the unlaid job n can be laid out by superposing the upper left corner of the rectangular area of the job n on the corner C of the print area S[m] without overlapping another job. If the layout is possible. (YES in step S1109), the process advances to step S1110. If the layout is impossible (NO in step S1109), the process advances to step S1116.

In step S1110 the bookbinding application 104 lays out the upper left corner of the rectangular area of the job n at the corner C of the print area S[m]. In step S1111, the bookbinding application 104 sets ON the layout flag of the job n. In step S1112, the bookbinding application 104 increments the corner C of the print area S[m] by one.

In step S1113, if jobs are laid out at the corners of the entire sheet surfaces, the bookbinding application 104 uses an inner unlaid area. If the print area S[0] and C>3, the unlaid area where no job is laid out is divided into a rectangular print area S[p]. The newly divided print area shares a side with a print area where a job has been laid out. Thus, a job laid out in the new print area can share a boundary with a job which has already been laid out.

In step S1114, the bookbinding application 104 sets the print area number m again in accordance with the result of dividing the unlaid area in step S1113. In step S1115, the bookbinding application 104 increments the job number n by one and processes the next job. Thereafter, the process returns to step S1108.

If the layout is impossible in step S119 (NO in step S1109), the bookbinding application 104 rotates the rectangular area of the job n through 90° in step S1116. In step S1117, the bookbinding application 104 determines whether the unlaid job n can be laid out by superposing the upper left corner of the rectangular area of the job n on the corner C of the print area S[m] without overlapping another job. If the layout is possible (YES in step S1117), the process advances to step S1110. If the layout is impossible (NO in step S1117), the process advances to step S1115.

If the number of jobs is equal to or larger than 5 (NO in step S1105), the bookbinding application 104 sorts jobs in the area order in step S1107.

In step S1118, the bookbinding application 104 determines whether the unlaid job of the largest area can be laid out by superposing the upper left corner of the rectangular area of the job on the corner C of the print area S[m] without overlapping another job. If the layout is possible (YES in step S1118), the process advances to step S1119. In step S1119, the bookbinding application 104 lays out the upper left corner of the rectangular area of the job of the largest area at the corner C of the print area S[m]. In step S1120, the bookbinding application 104 sets ON the layout flag of the laid-out job. In step S1121, the bookbinding application 104 increments the corner C of the print area S[m] by one.

If the layout is impossible (NO in step S1118), the process advances to step S1122. In step S1122, the bookbinding application 104 selects a job of the next largest area. Then, the process advances to step S1118.

In the layout process of FIGS. 11A and 11B, target jobs are properly laid out one by one in the print area to decide their final layout positions. However, the layout process is not limited to this. In general, the size of a print sheet for use and the layout size (finish page size) necessary to lay out each job can be acquired from the job itself or setting information.

For this purpose, an optimal job layout based on a combination of the number of jobs to be laid out and the layout size of each jobs is ensured as template data in advance in accordance with the size of a print sheet. In processing, the template data are referred to select template data which meets the condition of a target job. A layout defined by the selected template data can be decided as a final layout.

Layout Examples

Figure 12B:
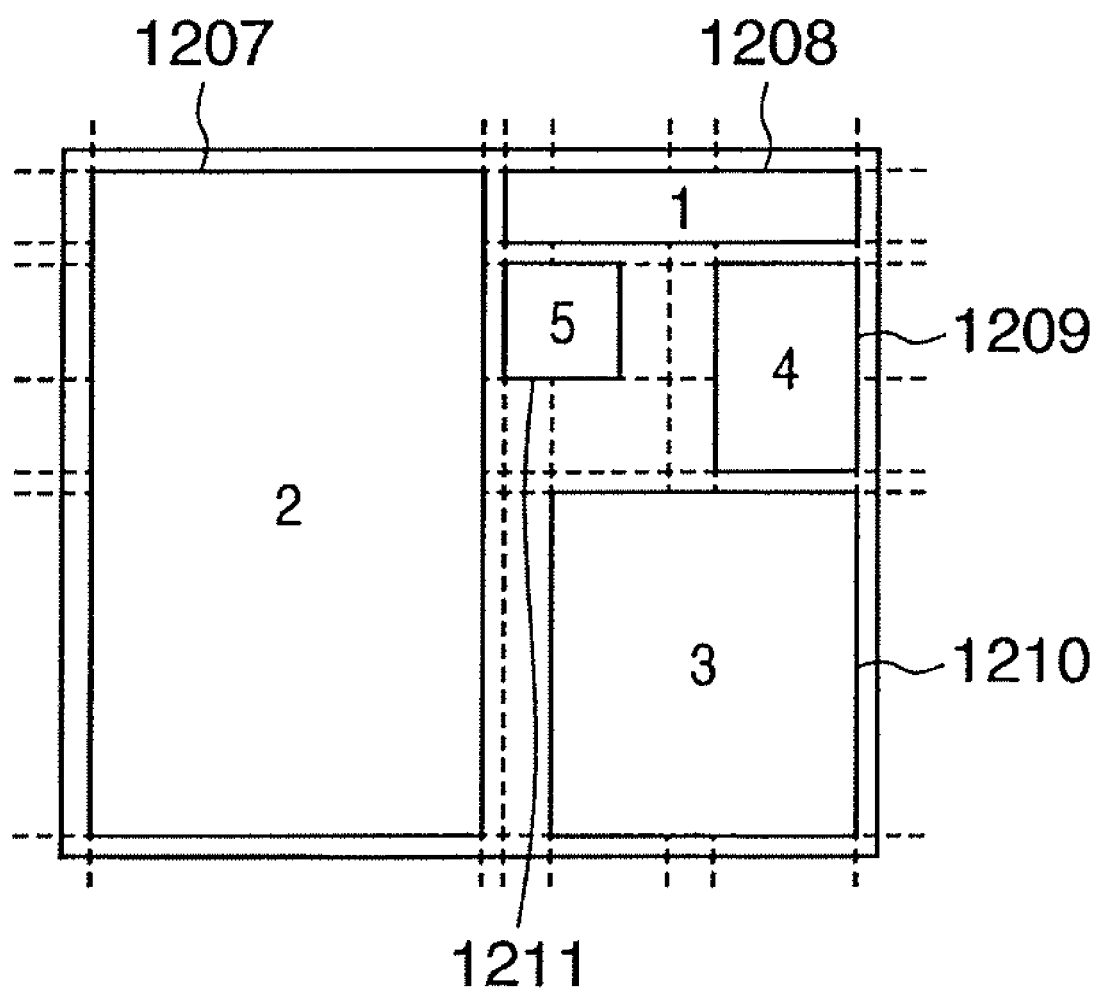

FIGS. 12A and 12B are views showing layout examples by the layout process in FIGS. 11A and 11B according to the first embodiment of the present invention.

FIG. 12A shows examples of laying out three jobs. In this case, processes in step S1106 and subsequent steps in FIGS. 11A and 11B are executed.

Layouts 1201 and 1202 are results of laying out first job 1 when three jobs are input. The layout 1202 is obtained by rotating job 1 through 90°. The remaining jobs are sequentially laid out in the input order.

Layouts 1204 are generated by laying out second job 2 on the layout result of job 1. Four layouts are available as a result of excluding layouts 1203 (×) in each of which jobs overlap each other.

Layouts 1206 are generated by laying out job 3 on the layout results of jobs 1 and 2. Six layouts are finally available as a result of excluding layouts 1205 (×) in each of which jobs overlap each other.

In this case, the cutting difficulties of the six layout candidates are calculated.

FIG. 12B shows an example of laying out five jobs. In this case, processes in step S1107 and subsequent steps in FIGS. 11A and 11B are executed.

Job 2 of the largest area is laid out in an area 1207. The remaining jobs are sequentially laid out in the area order. In this case, jobs 1, 3, 4, and 5 are respectively laid out in areas 1208, 1209, 1210, and 1211. Jobs 4 and 5 are laid out in areas formed by jobs 1 and 3, and can share area lines with laid-out jobs.

[Cutting Procedure Decision Process]

Details of the cutting procedure decision process in step S1005 of FIG. 10 will be explained with reference to FIGS. 13A to 13C.

Figure 13A:
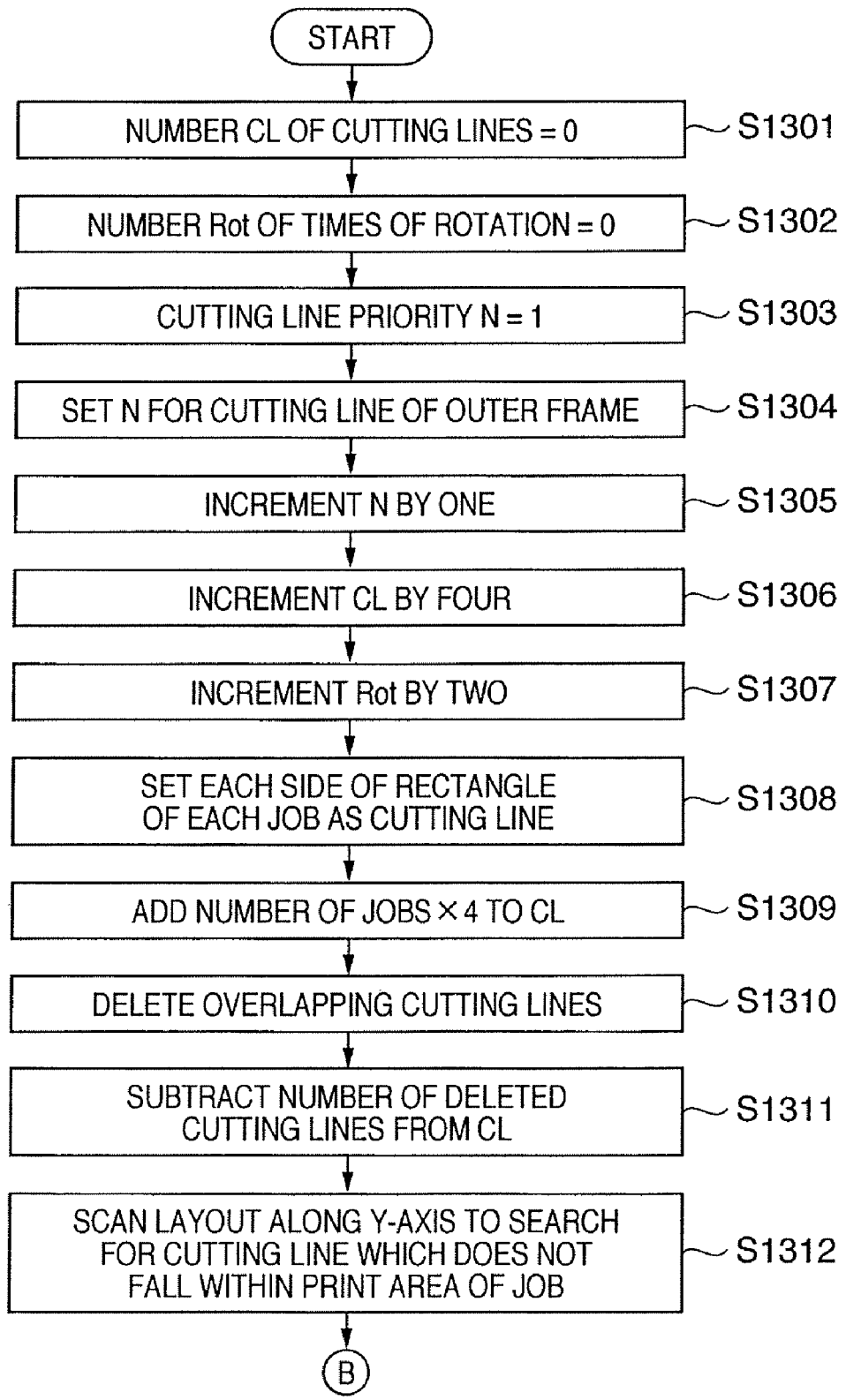
FIGS. 13A to 13C are flowcharts showing details of the cutting procedure decision process according to the first embodiment of the present invention.
Figure 13B:
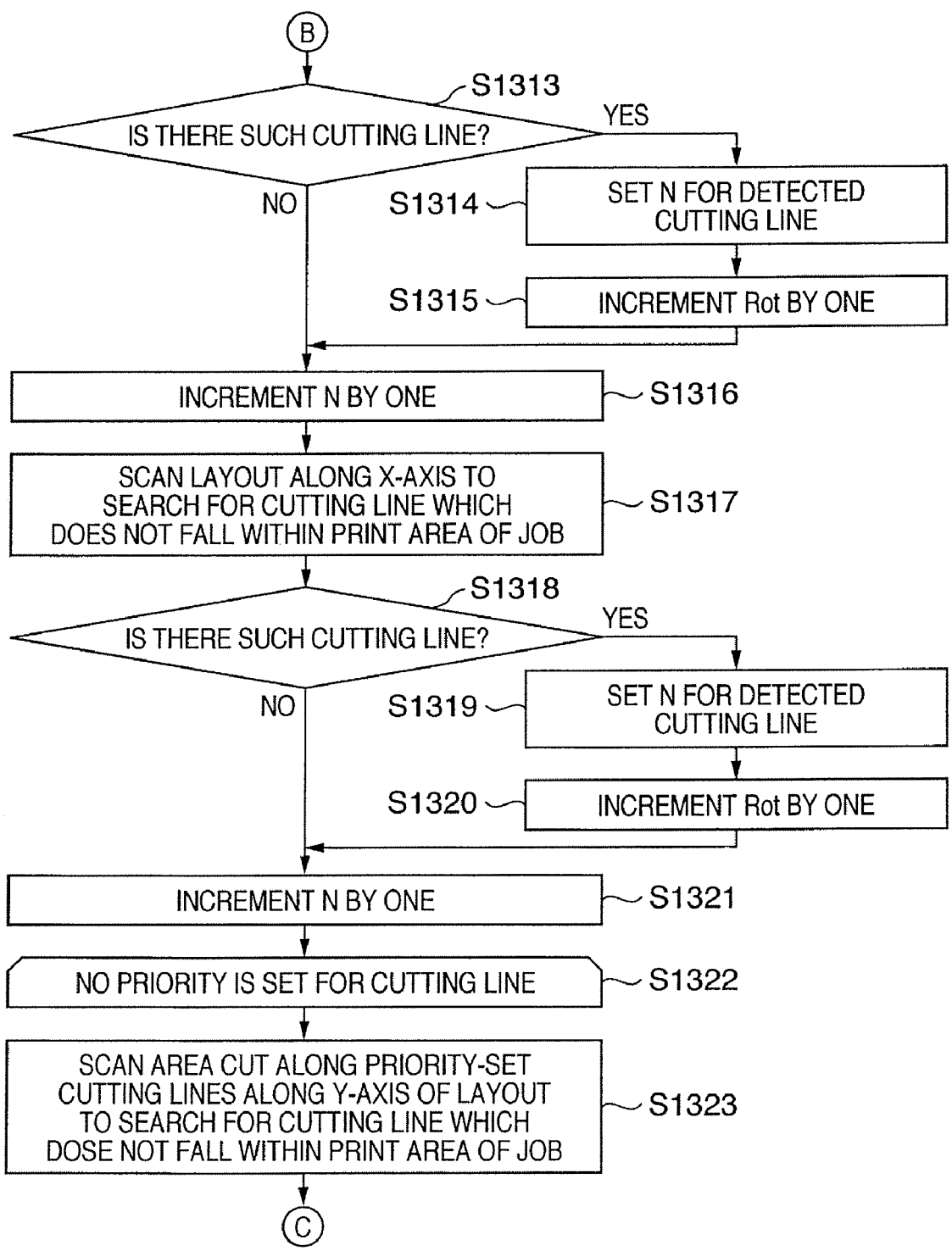
Figure 13C:
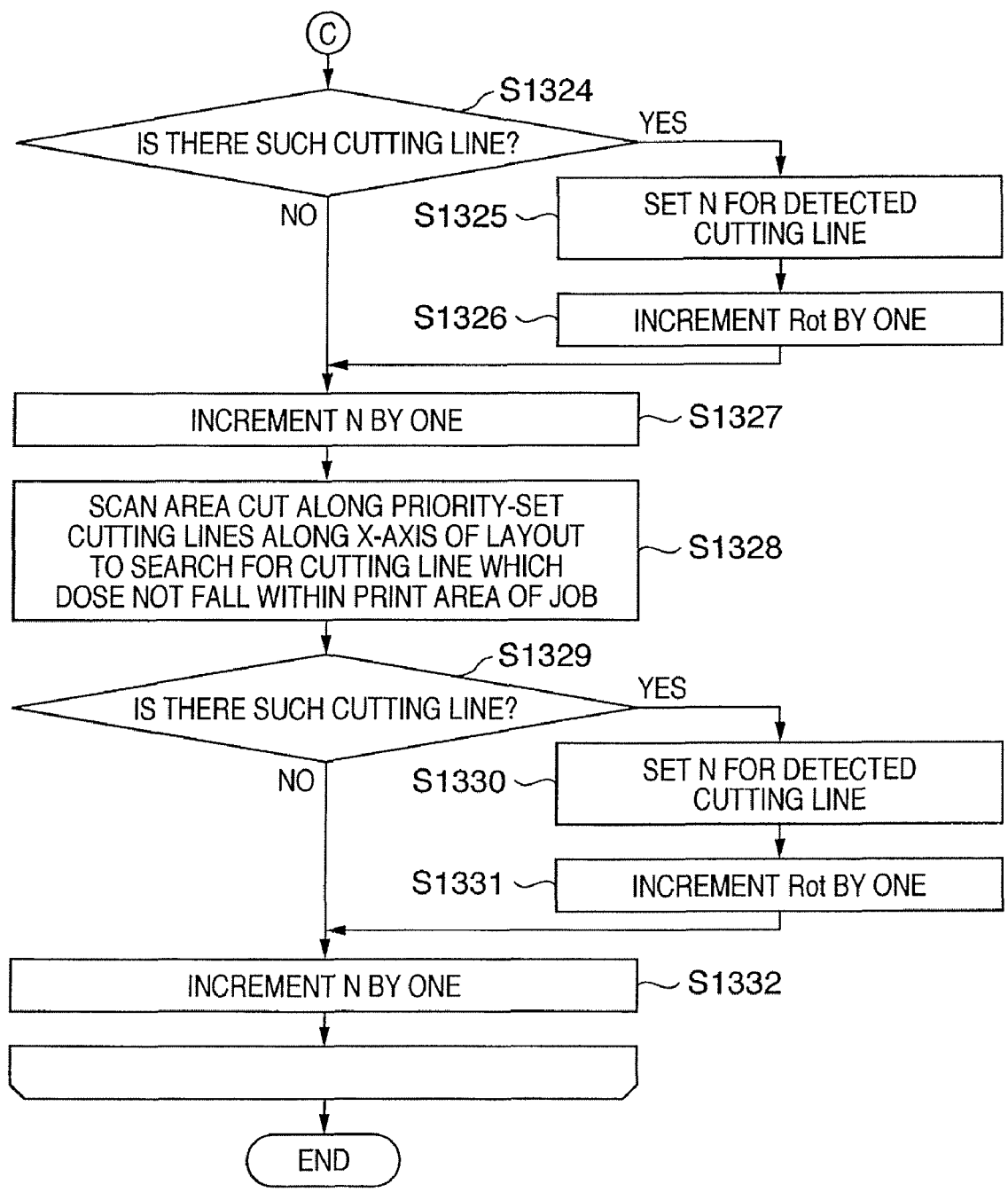

FIGS. 13A to 13C are flowcharts showing details of the cutting procedure decision process according to the first embodiment of the present invention.

More specifically, this operation is implemented by an arithmetic process executed by the CPU 9201 on the basis of the program of the bookbinding application 104. For easy understanding, this operation will be explained as that of the bookbinding application 104. The cutting procedures of the cutter after printing are decided by calculating the positions of cutting lines (dotted lines) and rotation timings for a plurality of layouts established by the following process.

In step S1301, the bookbinding application 104 initializes the variable CL representing the number of cutting lines on a print sheet (CL=0). In step S1302, the bookbinding application 104 initializes the variable Rot representing the number of times of rotation of a print sheet in the cutting process (Rot=0). In step S1303, the bookbinding application 104 initializes N representing cutting line priority (N=1). In step S1304, the bookbinding application 104 sets the outer frame of the entire sheet as cutting lines.

In step S1305, the bookbinding application 104 increments N by one. In step S1306, the bookbinding application 104 increments the variable CL by four. In step S1307, the bookbinding application 104 increments the variable Rot by two. In step S1308, the bookbinding application 104 sets each side of the rectangle of each job as a cutting line. In step S1309, the bookbinding application 104 adds the number of cutting lines (number of jobs×4) set in step S1308 to the variable CL. In step S1310, the bookbinding application 104 deletes overlapping cutting lines.

In step S1311, the bookbinding application 104 subtracts the number of cutting lines deleted in step S1310 from the variable CL. In step S1312, the bookbinding application 104 scans the layout along the Y-axis to search for a cutting line which does not fall within the print area of a job.

In step S1313, the bookbinding application 104 determines whether there is such a cutting line. If there is no such cutting line (NO in step S1313), the process advances to step S1316. If there is such a cutting line (YES in step S1313), the process advances to step S1314. In step S1314, the bookbinding application 104 sets priority N for the cutting line detected in step S1312. In step S1315, the bookbinding application 104 increments the variable Rot by one.

In step S1316, the bookbinding application 104 increments priority N by one. In step S1317, the bookbinding application 104 scans the layout along the X-axis to search for a cutting line which does not fall within the print area of a job.

In step S1318, the bookbinding application 104 determines whether there is such a cutting line. If there is no such cutting line (NO in step S1318), the process advances to step S1321. If there is such a cutting line (YES in step S1318), the process advances to step S1319. In step S1319, the bookbinding application 104 sets priority N for the cutting line detected in step S1317. In step S1320, the bookbinding application 104 increments the variable Rot by one.

In step S1321, the bookbinding application 104 increments priority N by one.

In steps S1322 to S1332, the bookbinding application 104 executes a loop process. The process in steps S1322 to S1332 is repeated until priority is set to all cutting lines.

In step S1323, the bookbinding application 104 scans each area cut along priority-set cutting lines along the Y-axis of the layout to search for a cutting line which dose not fall within the print area of a job.

In step S1324, the bookbinding application 104 determines whether there is such a cutting line. If there is no such cutting line (NO in step S1324), the process advances to step S1327. If there is such a cutting line (YES in step S1324), the process advances to step S1325. In step S1325, the bookbinding application 104 sets priority N for the cutting line detected in step S1323. In step S1326, the bookbinding application 104 increments the variable Rot by one.

In step S1327, the bookbinding application 104 increments priority N by one.

In step S1328, the bookbinding application 104 scans each area cut along priority-set cutting lines along the X-axis of the layout to search for a cutting line which dose not fall within the print area of a job.

In step S1329, the bookbinding application 104 determines whether there is such a cutting line. If there is no such cutting line (NO in step S1329), the process advances to step S1332. If there is such a cutting line (YES in step S1329), the process advances to step S1330. In step S1330, the bookbinding application 104 sets priority N for the cutting line detected in step S1328. In step S1331, the bookbinding application 104 increments the variable Rot by one.

In step S1332, the bookbinding application 104 increments priority N by one.

If the end condition of the loop process in step S1322 is not satisfied, the process advances to step S1323. If the end condition is satisfied, the cutting procedure decision process ends.

[Setting Example of Cutting Procedures]

Figure 14:
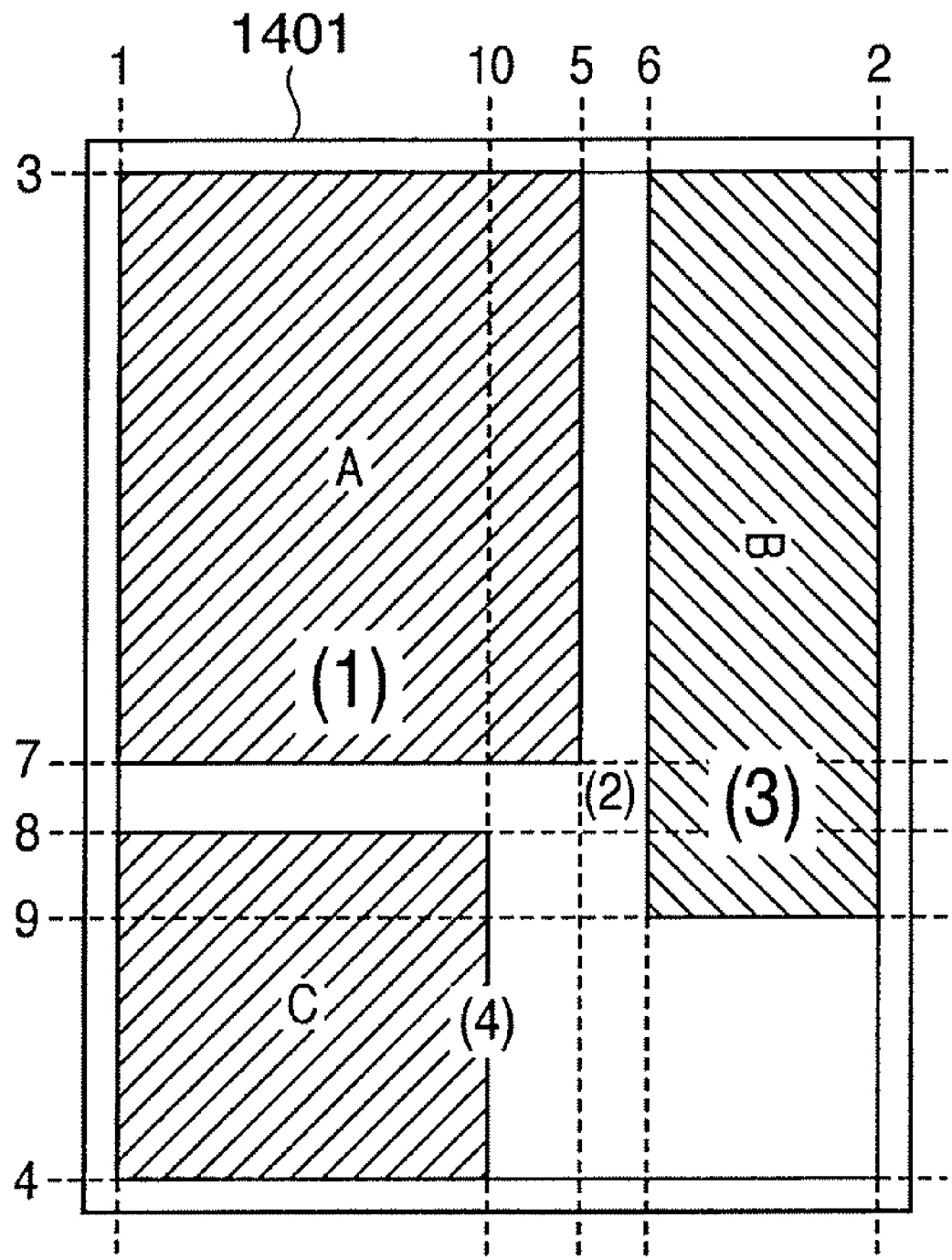
FIG. 14 is a view showing a setting example of cutting procedures according to the first embodiment of the present invention.

FIG. 14 is a view showing a setting example of cutting procedures according to the first embodiment of the present invention.

FIG. 14 shows an example of setting cutting procedures for a given layout on the basis of the cutting procedure decision process in FIGS. 13A to 13C.

Three jobs A, B, and C are laid out on a print sheet 1401. The four sides of the print area of the print sheet 1401, and the four sides of the print area of each job are set as cutting lines. Excluding overlapping cutting lines yields 10 cutting lines in FIG. 14.

First, lines which define the outer frame of the print area of the print sheet 1401 are set as cutting lines 1, 2, 3, and 4. Since the print sheet 1401 needs to be rotated through 90° after cutting along cutting lines 1 and 2, the number of times of rotation is incremented by one.

Cutting lines along the longitudinal axis are scanned to search for a cutting line which does not fall within each job area. At this time, the number of times of rotation is incremented by one in order to rotate the print sheet 1401 through 90° (search along the lateral axis).

In FIG. 14, two lines between jobs A and B are set as cutting lines 5 and 6.

A cutting line which does not fall within the print area of each job is searched for along the lateral axis. Since there is no such line, no cutting line is set, and the number of times of rotation is not incremented.

The cutting procedures of three rectangular areas created by cutting along cutting lines 5 and 6 are set. Each rectangular area is as follows.

Rectangular area (1): on the left side of cutting line 5 (containing jobs A and C)

Rectangular area (2): between cutting lines 5 and 6 (containing no job)

Rectangular area (3): on the right side of cutting line 6 (containing job B)

Of these rectangular areas, rectangular area (2) does not contain any job and is excluded. Rectangular area (1) is scanned to search for a cutting line. A cutting line which does not fall within a job is not detected along the longitudinal axis, so no cutting line is set. As for rectangular area (3), no cutting line is detected and set.

The print sheet 1401 is rotated through 90° to search rectangular areas (1) and (3) for a cutting line which does not fall within each job. As for rectangular area (1), cutting lines 7 and 8 are set. As for rectangular area (3), cutting line 9 is set. Then, the number of times of rotation is incremented by one.

Of rectangular areas created by cutting rectangular area (1) along cutting lines 7 and 8, a rectangular area below cutting line 8 is defined as rectangular area (4). The cutting line of rectangular area (4) is searched for again along the longitudinal axis, setting cutting line 10. The number of times of rotation is further incremented by one.

Setting of all cutting lines ends, and setting of the cutting procedures ends.

[Setting Example of Cutting]

Figure 15:
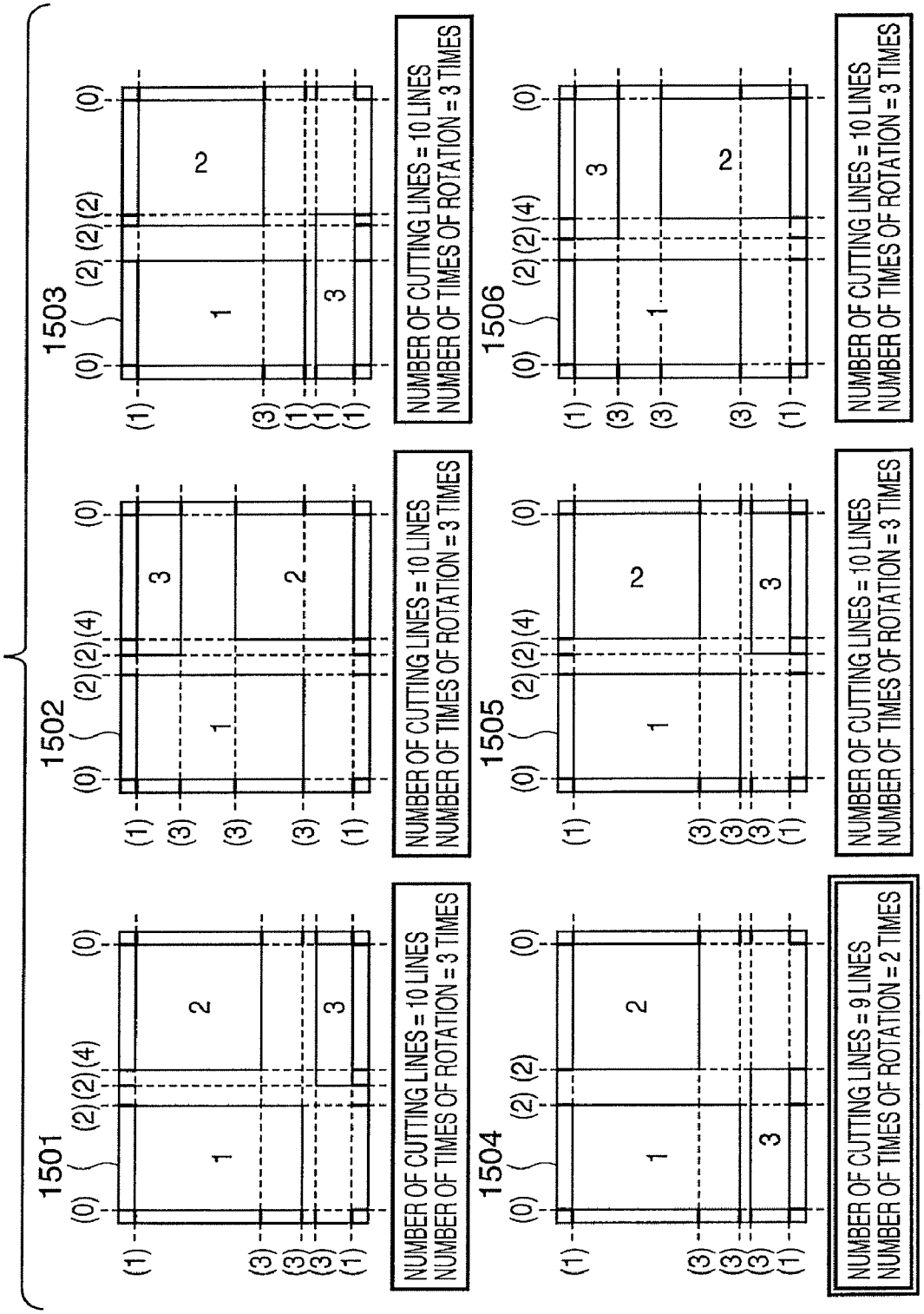
FIG. 15 is a view showing a setting example of cutting according to the first embodiment of the present invention.

FIG. 15 is a view showing a setting example of cutting according to the first embodiment of the present invention.

FIG. 15 shows an example of setting cutting procedures by the cutting procedure decision process in FIGS. 13A to 13C for a plurality of layout candidates.

In FIG. 15, cutting lines and rotation are set for six layouts 1501, 1502, 1503, 1504, 1505, and 1506. Each parenthesized number in FIG. 15 represents cutting upon each rotation. That is, (1) represents cutting after one 90° rotation. Of the six layouts, the layout 1504 exhibits the smallest number of cutting lines and the smallest number of times of rotation.

In other words, the cutting difficulty of the layout 1504 is the lowest among cutting difficulties obtained for the respective layout candidates in FIG. 15.

[Important Item Setting UI in Layout Process]

Figure 16:
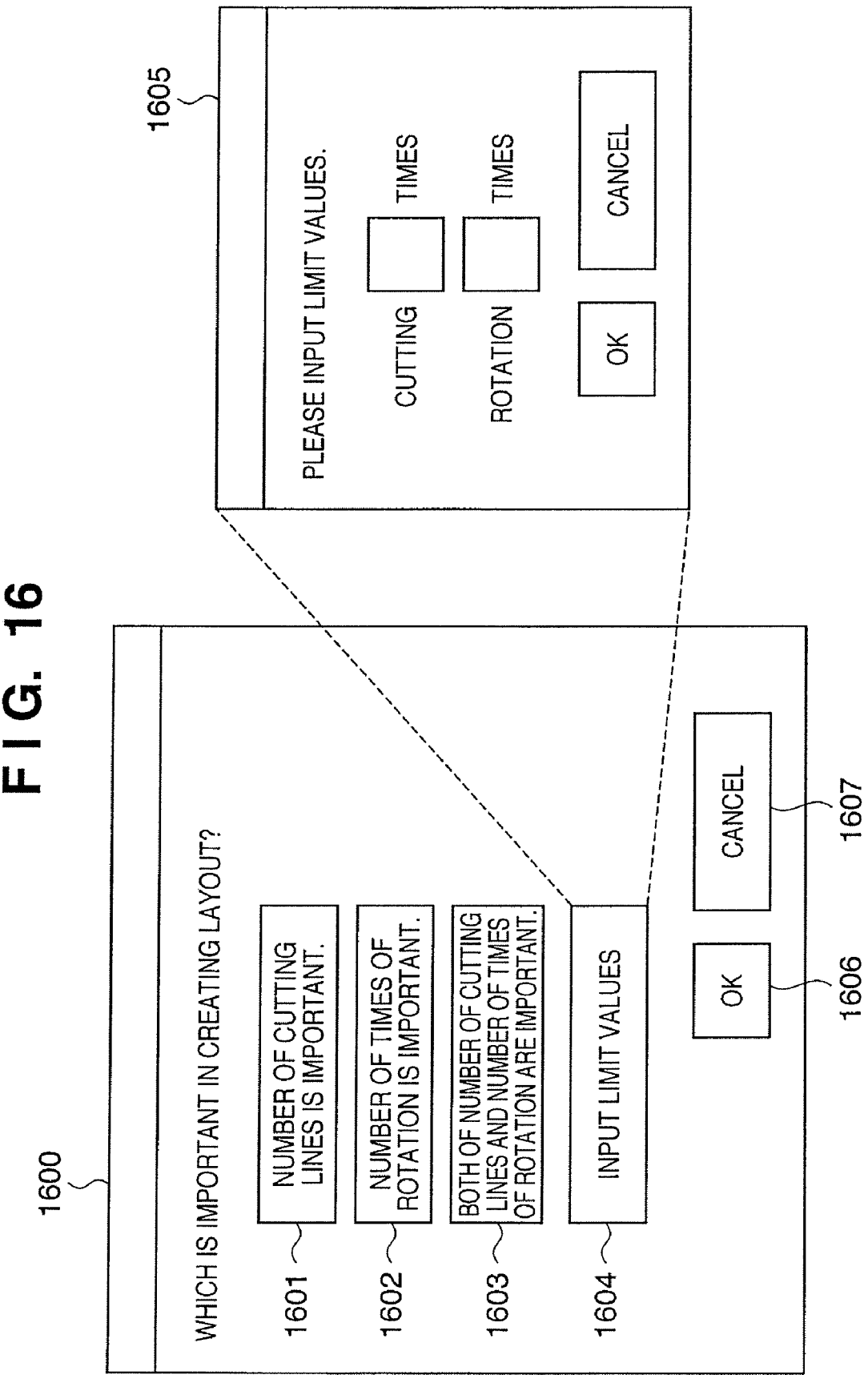
FIG. 16 is a view showing an example of a cutting setup window for setting the level of importance according to the first embodiment of the present invention.

FIG. 16 is a view showing an example of a cutting setup window for setting the level of importance according to the first embodiment of the present invention.

A cutting setup window 1600 in FIG. 16 is an important item UI (User Interface) for setting an important item in layout creation in step S1003 of FIG. 10. The UI is generated by, e.g., the bookbinding application 104 and displayed on the display of the client PC 901 as needed.

To form a layout with a minimum number of cutting lines, the user selects "the number of cutting lines is important" (button control 1601) in the cutting setup window 1600. To form a layout with a minimum number of times of rotation in cutting, the user selects "the number of times of rotation is important" (button control 1602) in the cutting setup window 1600.

To balance the number of cutting lines and the number of times of rotation with each other, the user selects "both of the number of cutting lines and the number of times of rotation are important" (button control 1603) in the cutting setup window 1600.

The cutting setup window 1600 also allows the user to input limit values in layout creation. When inputting limit values, the user selects "input limit values" (button control 1604). Then, a subwindow 1605 appears to allow the user to designate the numerical value of the number of cutting lines and that of the number of times of rotation as limit values. An embodiment associated with the limit values will be described as the third embodiment.

If the user operates the OK button in the subwindow 1605 after designating numerical values, the subwindow 1605 disappears, and the RAM 9202 of the computer 9100 temporarily holds the numerical values as limit values. If the user operates the cancel button, the subwindow 1605 disappears.

If the user operates an OK button 1606 after various operations in the cutting setup window 1600, the RAM 9202 of the computer 9100 holds setting values corresponding to the operations. If the user operates a cancel button 1607, the cutting setup window 1600 disappears.

[Printing of Cutting Procedures]

Figure 17:
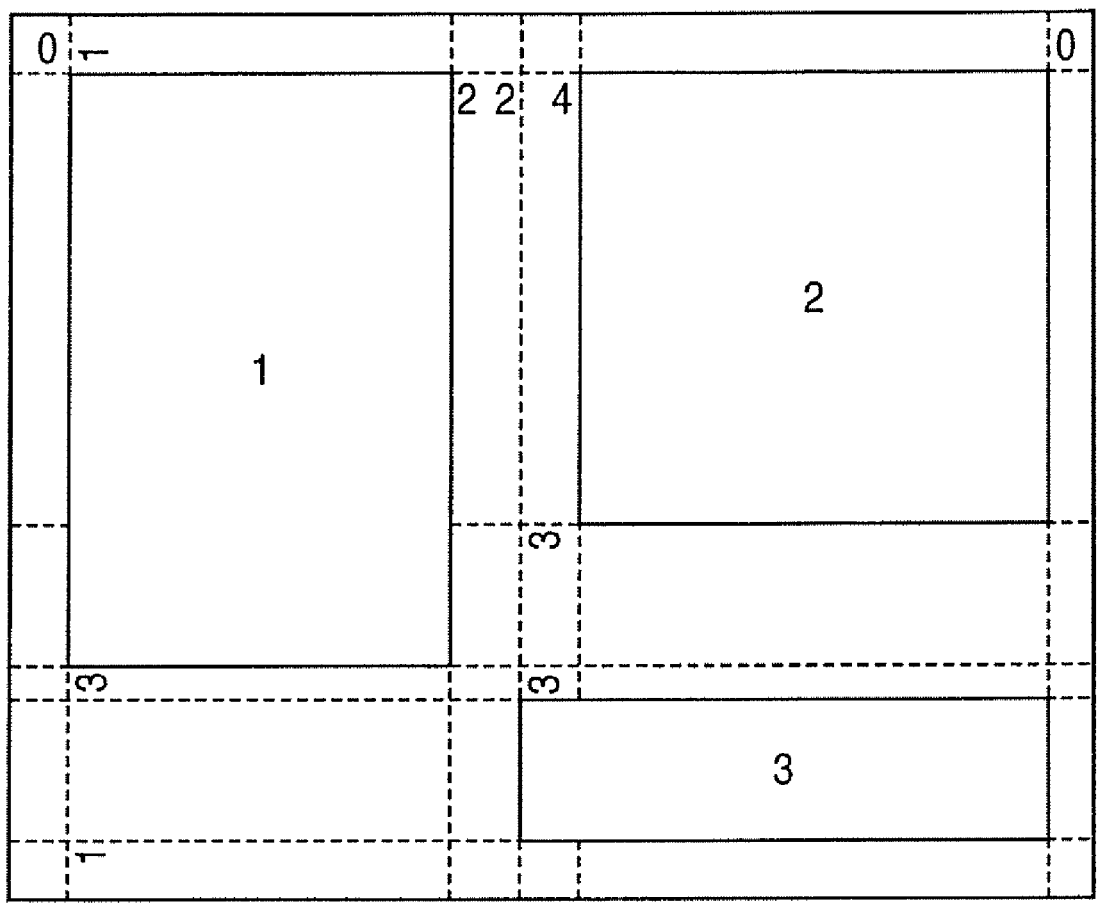
FIG. 17 is a view showing an example of printing a cutting order number on a cutting line (printer's mark) on a print sheet according to the first embodiment of the present invention.

FIG. 17 is a view showing an example of printing a cutting order number on a cutting line (printer's mark) on a print sheet according to the first embodiment of the present invention.

The operator can execute the cutting process in accordance with the print procedures, reducing cutting errors. Cutting order numbers are printed in the margin.

Cutting order numbers are printed at a portion which becomes unnecessary after cutting in the margin. In FIG. 17, cutting order number "0" is printed on a sheet to be cut off, and thus the operator does not refer to the cutting order number after the process, reducing cutting errors in the subsequent process. The operator suffices to cut a sheet while always searching for the minimum cutting order number on the sheet.

Cutting order numbers are printed in the forward direction of cutting. In FIG. 17, a sheet is cut along a cutting line of cutting order number 113 after rotated through 90° from the state of FIG. 17. Thus, cutting order number "3" is printed after rotating the sheet through 90°.

As described above, the first embodiment can generate print data with a layout having the minimum number of cutting lines and the minimum number of times of rotation of the printed sheet in the cutting process of a printed sheet when laying out and printing a plurality of jobs on one print sheet.

When generating the print data, the level of importance of the number of cutting lines and that of the number of times of rotation can be designated as important items of the process. Print data with a more appropriate layout can be generated in accordance with the specifications of a cutter for use.

Second Embodiment

The first embodiment has described the configuration which generates print data with a layout having the minimum number of cutting lines and the minimum number of times of rotation of the printed sheet in the cutting process of a printed sheet when laying out and printing a plurality of jobs on one print sheet.

To the contrary, the second embodiment will describe a configuration capable of, when layouts of the same cutting difficulty are created, selecting a desired one of the layouts of the same cutting difficulty or another layout, while adopting the configuration of the first embodiment.

Figure 18:
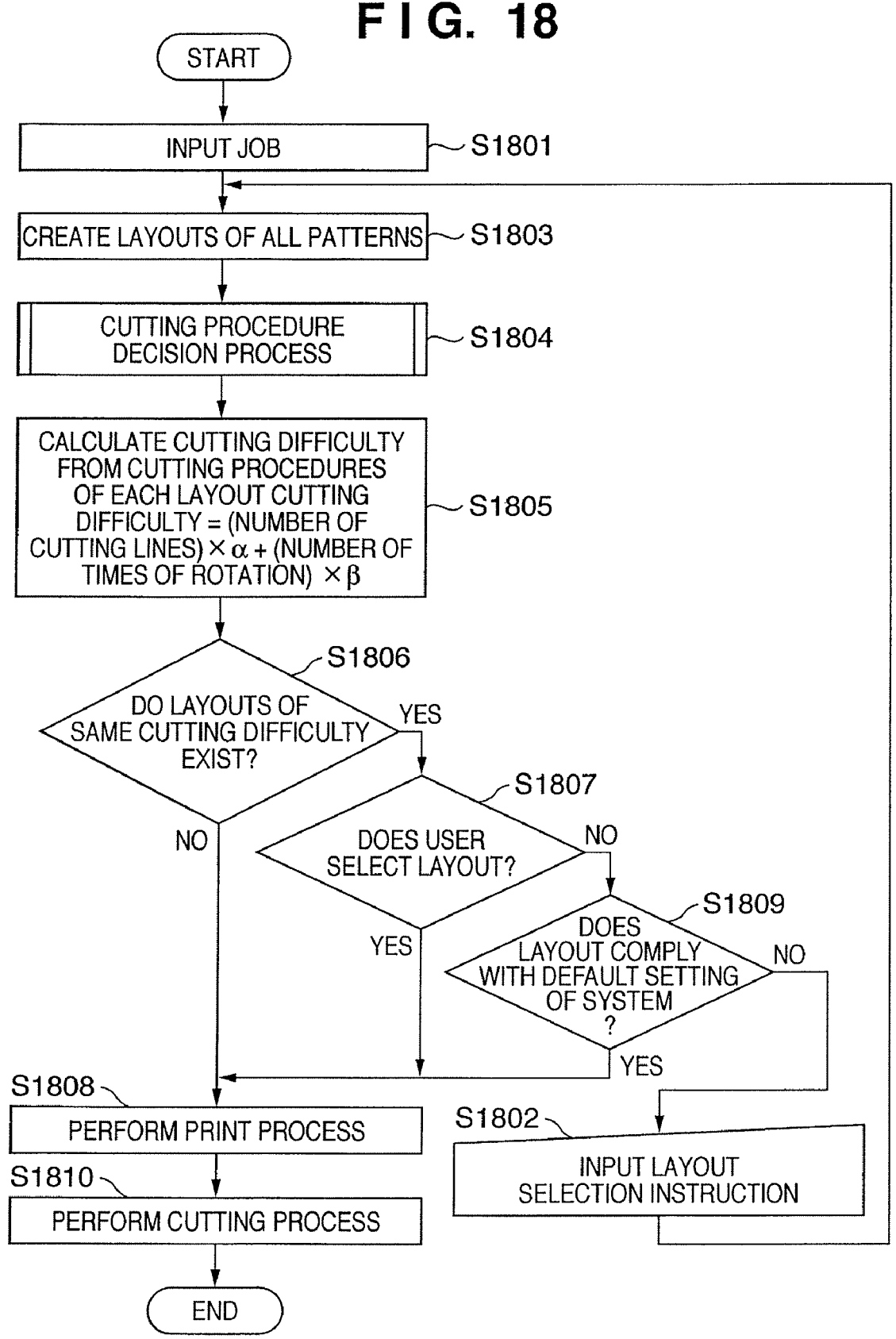
FIG. 18 is a flowchart showing the process of a printing and bookbinding system according to the second embodiment of the present invention.

FIG. 18 is a flowchart showing the process of a printing and bookbinding system according to the second embodiment of the present invention.

More specifically, this operation is implemented by arithmetic processes executed by CPUs incorporated in a client PC 901, MIS server 903, prepress server 910, device 904, and cutter 908 on the basis of programs stored in their memories. The operation will be explained using the names of the devices (client PC 901, MIS server 903, prepress server 910, device 904, and cutter 908) for easy understanding of main processors of the operation.

In step S1801, the prepress server 910 receives via the MIS server 903 a job 902 issued from the client PC 901 of a user.

In step S1802, the user inputs a layout selection instruction via the client PC 901. The process in step S1802 is executed generally when the process shifts from step S1809.

In step S1803, the prepress server 910 executes the layout process to lay out received jobs on a print sheet, creating layouts of all patterns serving as layout candidates. In step S1804, the prepress server 910 executes the cutting procedure decision process for each layout created in step S1803 to decide cutting procedures. Details of the cutting procedure decision process will be described later.

In step S1805, the prepress server 910 calculates the cutting difficulty on the basis of the cutting procedures decided in step S1804. As the measure, the number of cutting lines and the number of times of rotation of a print sheet in the cutting process are employed. More specifically, the prepress server 910 calculates the cutting difficulty=(the number of cutting lines)×α+(the number of times of rotation)×β. In this case, α and β may be set in advance or set separately by the prepress server 910.

In step S1806, the prepress server 910 determines the cutting difficulty calculated in step S1805 to select a layout of the lowest cutting difficulty. Then, the prepress server 910 determines whether a plurality of layouts having the selected lowest cutting difficulty exist. If a plurality of layouts having the selected lowest cutting difficulty exist (YES in step S1806), the process advances to step S1807.

In step S1907, the prepress server 910 presents the user via the client PC 901 with a dialog representing that a plurality of layouts having the lowest cutting difficulty exist. The prepress server 910 accepts an instruction on whether the user himself selects a layout.

If the prepress server 910 receives the instruction that the user himself selects a layout (YES in step S1807), the prepress server 910 presents the client PC 901 with a layout confirmation window showing layouts of the lowest cutting difficulty. This allows the user to select a desired layout in the layout confirmation window. Particularly when the user selects a layout in the layout confirmation window, the selected layout is specified, and then the process advances to step S1808.

If the user does not select any layout in the layout confirmation window (NO in step S1807), the process advances to step S1809.

In step S1809, the prepress server 910 presents the client PC 901 with a confirmation window to inquire whether to comply with a default setting of the system in layout selection. If the user inputs an instruction via the confirmation window to comply with the default setting (YES in step S1809), the prepress server 910 selects a default setting layout, and the process advances to step S1808. If the user inputs an instruction not to comply with the default setting (NO in step S1809), the process returns to step S1802, and the prepress server 910 presents the client PC 901 with a layout selection window to allow the user to select a desired layout. The user inputs a desired layout selection instruction via the layout selection window.

If only one layout having the lowest cutting difficulty exists in step S1806, if the user selects a layout in step S1807, or if the layout complies with a default setting in step S1809, the prepress server 910 generates print data on the basis of the selected layout and outputs it to the device 904.

In step S1808, the device 904 prints the print data on the basis of print setting information set in the print data received from the prepress server 910.

In step S1810, the cutter 908 cuts a material printed in step S1808 along the layout and cutting lines. A cut output material 909 is delivered to the user, and the process ends. When the printed material is to undergo a post-process by an offline finisher, the operator sets the printed material in the cutter 908 and executes a cutting process requiring the intervention of an operator's operation (rotation of a print sheet).

[Cutting Procedure Decision Process]

Details of the cutting procedure decision process in step S1804 of FIG. 18 will be explained with reference to FIGS. 19A to 19C.

Figure 19A:
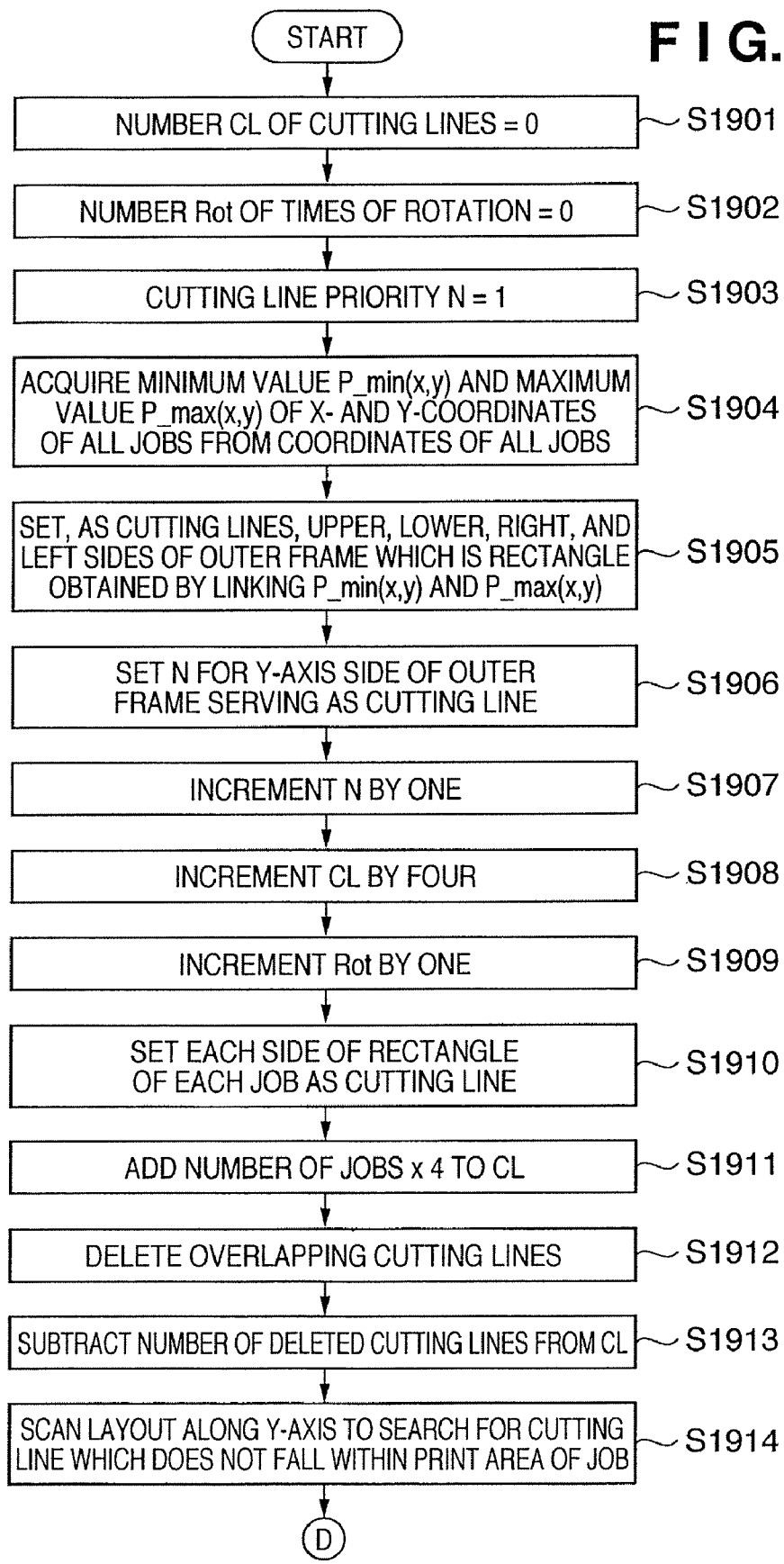
FIGS. 19A to 19C are flowcharts showing the cutting procedure decision process according to the second embodiment of the present invention.
Figure 19B:
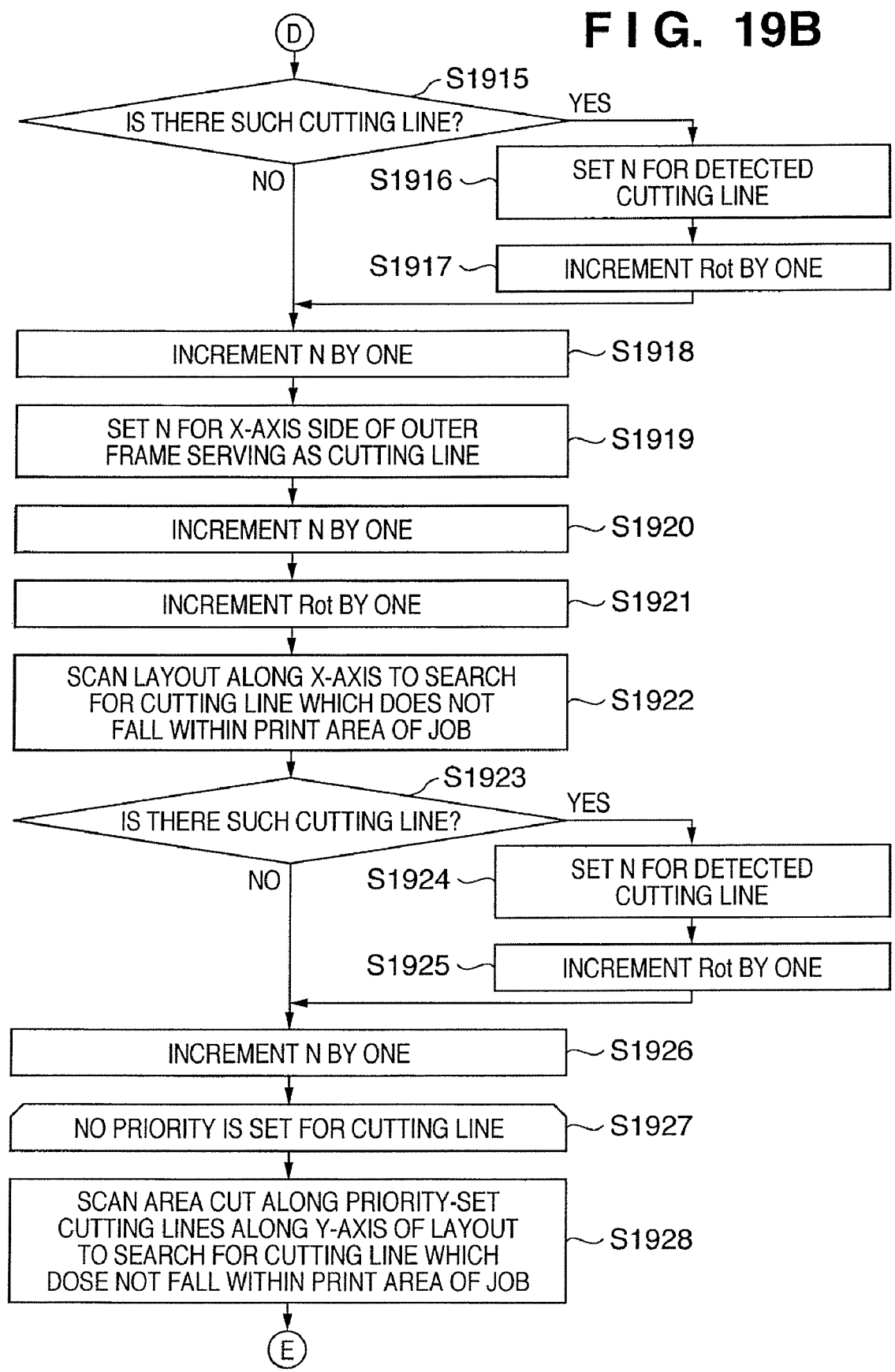
Figure 19C:
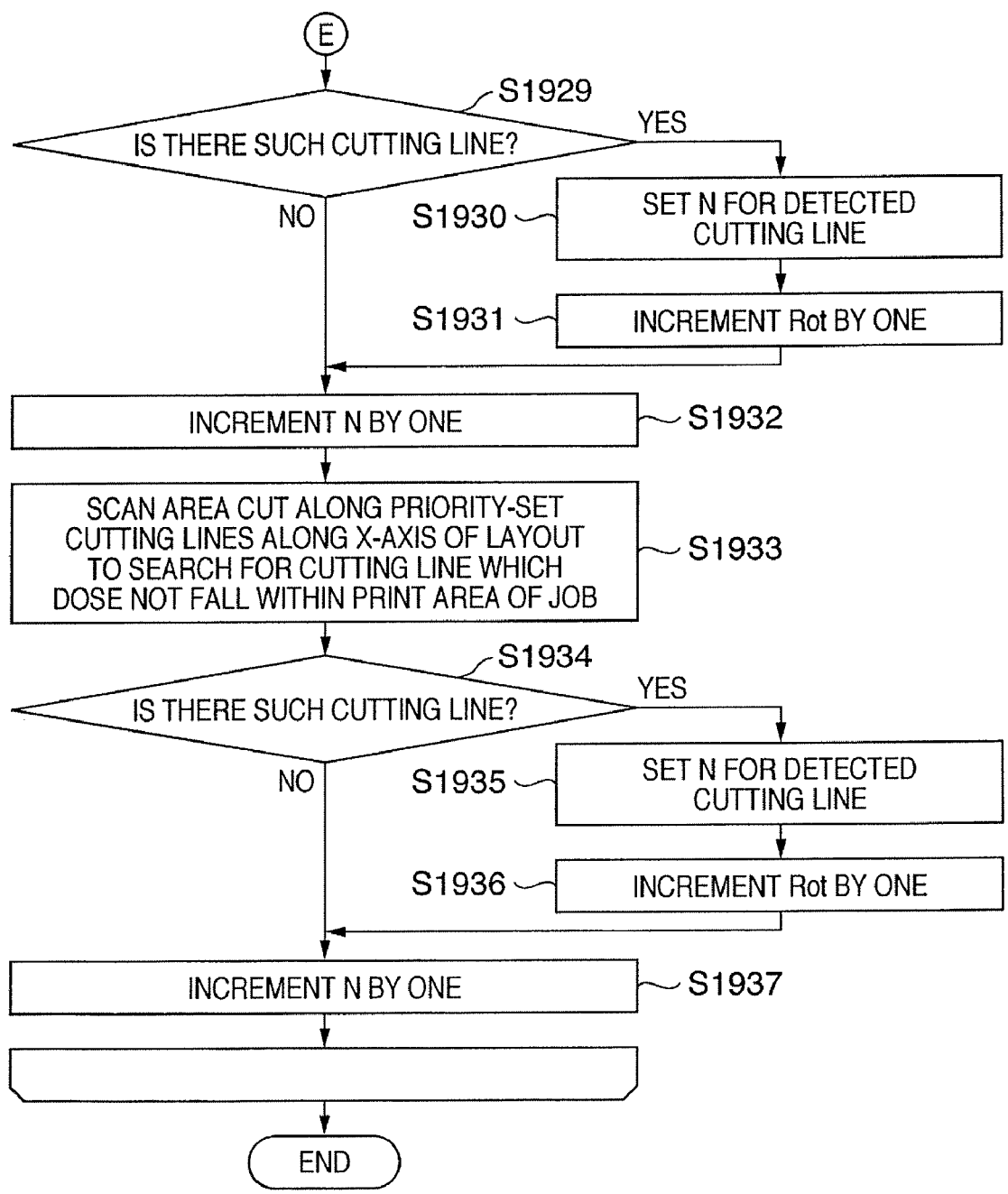

FIGS. 19A to 19C are flowcharts showing the cutting procedure decision process according to the second embodiment of the present invention.

More specifically, this operation is implemented by an arithmetic process executed by the CPU 9201 on the basis of the program of a bookbinding application 104. For easy understanding, this operation will be explained as that of the bookbinding application 104.

In step S1901, the bookbinding application 104 initializes the variable CL representing the number of cutting lines on a print sheet (CL=0). In step S1902, the bookbinding application 104 initializes the variable Rot representing the number of times of rotation of a print sheet in the cutting process (Rot=0). In step S1903, the bookbinding application 104 initializes N representing cutting line priority (N=1). In step S1904, the bookbinding application 104 acquires the minimum value P_min (Xmin, Ymin) and maximum value P_max (Xmax, Ymax) of the coordinate values of all jobs among the coordinates of all laid-out jobs.

In step S1905, the bookbinding application 104 creates a rectangle R by linking P_max and P_min, and sets the four sides of the rectangle R as cutting lines. In step S1906, the bookbinding application 104 sets cutting priority N for the Y-axis line of the rectangle R. In step S1907, the bookbinding application 104 increments N by one. In step S1908, the bookbinding application 104 increments the variable CL by four. In step S1909, the bookbinding application 104 increments the variable Rot by one.

In step S1910, the bookbinding application 104 sets each side of the laid-out job as a cutting line. In step S1911, the bookbinding application 104 adds the number of cutting lines (number of jobs×4) set in step S1910 to the variable CL. In step S1912, the bookbinding application 104 deletes overlapping cutting lines.

In step S1913, the bookbinding application 104 subtracts the number of cutting lines deleted in step S1912 from the variable CL. In step S1914, the bookbinding application 104 scans the layout along the Y-axis to search for a cutting line which does not fall within the print area of a job.

In step S1915, the bookbinding application 104 determines whether there is such a cutting line. If there is no such cutting line (NO in step S1915), the process advances to step S1918. If there is such a cutting line (YES in step S1915), the process advances to step S1916. In step S1916, the bookbinding application 104 sets priority N for the cutting line detected in step S1914. In step S1917, the bookbinding application 104 increments the variable Rot by one.

In step S1918, the bookbinding application 104 increments priority N by one. In step S1919, the bookbinding application 104 sets cutting priority N for the X-axis line of the rectangle R. In step S1920, the bookbinding application 104 increments N by one. In step S1921, the bookbinding application 104 increments the variable Rot by one.

In step S1922, the bookbinding application 104 scans the layout along the X-axis to search for a cutting line which does not fall within the print area of a job. In step S1923, the bookbinding application 104 determines whether there is such a cutting line. If there is no such cutting line (NO in step S1923), the process advances to step S1926. If there is such a cutting line (YES in step S1923), the process advances to step S1924. In step S1924, the bookbinding application 104 sets priority N for the cutting line detected in step S1922. In step S1925, the bookbinding application 104 increments the variable Rot by one.

In step S1926, the bookbinding application 104 increments priority N by one.

In steps S1927 to S1937, the bookbinding application 104 executes a loop process. The process in steps S1927 to S1937 corresponds to that in steps S1322 to S1332 of FIGS. 13B and 13C according to the first embodiment, and a description thereof will be omitted.

As described above, when a plurality of layouts having the same cutting difficulty exist, the second embodiment allows the user to select one of them or another layout, in addition to the effects described in the first embodiment.

If necessary, the user can select an intended layout, improving the flexibility of the system.

Third Embodiment

The third embodiment will describe a configuration of inputting the limit value of the number of cutting lines and that of the number of times of rotation, in addition to the configuration of the first embodiment.

Figure 20:
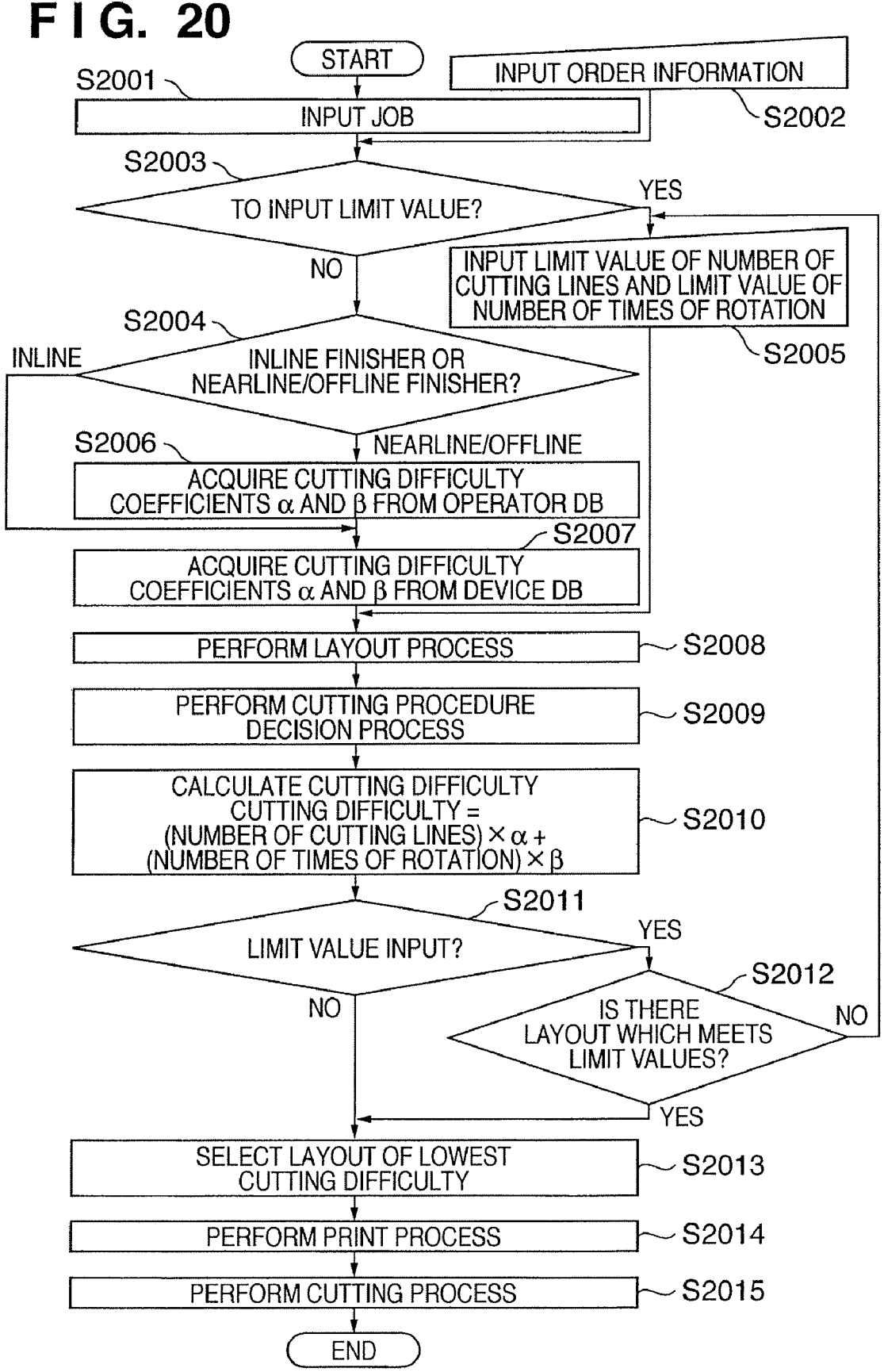
FIG. 20 is a flowchart showing the process of a printing and bookbinding system according to the third embodiment of the present invention.

FIG. 20 is a flowchart showing the process of a printing and bookbinding system according to the third embodiment of the present invention.

More specifically, this operation is implemented by arithmetic processes executed by CPUs incorporated in a client PC 901, MIS server 903, prepress server 910, device 904, and cutter 908 on the basis of programs stored in their memories. The operation will be explained using the names of the devices (client PC 901, MIS server 903, prepress server 910, device 904, and cutter 908) for easy understanding of main processors of the operation.

In step S2001, the prepress server 910 receives a job 902 issued from the client PC 901 of a user via the MIS server 903.

In step S2002, the user inputs order information including the cost and delivery time via the client PC 901 at the same time as the job. The user can input the limit value of the number of cutting lines and that of the number of times of rotation in a cutting setup window 1600 (FIG. 16) via the client PC 901.

In step S2003, the prepress server 910 determines whether the user has input the limit values from the client PC 901 of the user. If the user has input the limit values (YES in step S2003), a RAM 9202 stores the limit values, and the process advances to step S2005. In step S2005, the prepress server 910 receives the limit value of the number of cutting lines and that of the number of times of rotation in accordance with the input operation to the cutting setup window 1600.

If the user has not input any limit value (NO in step S2003), the prepress server 910 selects in step S2004 a device which is to perform the cutting process. If an inline finisher is to perform the cutting process, the process advances to step S2007. If a nearline or offline finisher is to perform the cutting process, the process advances to step S2006. In step S2006, the prepress server 910 acquires the cutting difficulty coefficient $\alpha$ (for the number of cutting lines) and the cutting difficulty coefficient $\beta$ (for the number of times of rotation) from an operator DB 906.

In step S2007, the prepress server 910 acquires the cutting difficulty coefficients $\alpha$ and $\beta$ from a device information DB 905. If the prepress server 910 has already acquired the cutting difficulty coefficients $\alpha$ and $\beta$ in step S2006, it adopts higher coefficients $\alpha$ and $\beta$.

In step S2008, the prepress server 910 performs the job layout process on the basis of a predetermined algorithm, generating all layouts. In step S2009, the prepress server 910 executes the cutting procedure decision process to decide the cutting procedures of each layout generated in step S2008.

In step S2010, the prepress server 910 calculates the cutting difficulty by acquiring the number of cutting lines and the number of times of rotation on the basis of the cutting procedures decided in step S2009. As the measure, the number of cutting lines and the number of times of rotation of a print sheet in the cutting process are employed. More specifically, the prepress server 910 calculates the cutting difficulty=(the number of cutting lines)×$\alpha$+(the number of times of rotation)×$\beta$.

In step S2011, the prepress server 910 determines whether the user has input the limit values. If the user has input the limit values (YES in step S2011), the process advances to step S2012. In step S2012, the prepress server 910 determines whether there is a layout which meets the limit values. In other words, the prepress server 910 determines whether there is a layout having the number of cutting lines and the number of times of rotation which are smaller than their limit values. If there is a layout which meets the conditions (YES in step S2012), the prepress server 910 deletes the remaining layouts, and the process advances to step S2013. If there is no layout which meets the conditions (NO in step S2012), the process advances to step S2005, and the prepress server 910 prompts the client PC 901 to input limit values again.

In step S2013, the prepress server 910 selects a layout of the lowest cutting difficulty from all layout candidates. The prepress server 910 generates print data on the basis of the selected layout, and outputs it to the device 904.

In step S2014, the device 904 prints the print data on the basis of print setting information (layout of the lowest cutting difficulty) set in the print data received from the prepress server 910.

In step S2015, the cutter 908 cuts a material printed in step S2015 along the layout and cutting lines. A cut output material 909 is delivered to the user, and the process ends. When the printed material is to undergo a post-process by an offline finisher, the operator sets the printed material in the cutter 908 and executes a cutting process requiring the intervention of an operator's operation (rotation of a print sheet).

[Device Database and Operator Database]

An example of the operator DB (DataBase) referred to in step S2006 of FIG. 20 and an example of the device information DB (DataBase) referred to in step S2007 will be explained with reference to FIG. 21.

FIG. 21 is a conceptual table showing the operator DB and device information DB according to the third embodiment of the present invention.

A device information DB 2101 manages the type of device and capability information of a cutter connected to the system. Capability information of the cutter is numerical information on a capability to cut along a straight line and a capability to rotate.

An operator DB 2102 holds numerical information on the capability of each operator for each device. When the cutter is an inline finisher, the prepress server can directly acquire the capability information from the cutter and does not refer to the operator database.

As described above, the third embodiment can generate print data with a layout which meets the number of cutting lines and the number of times of rotation intended by the user by setting their limit values, in addition to the effects described in the first embodiment.

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-127881 filed on May 1, 2006, which is hereby incorporated by reference herein in its entirety.

What is claimed is:

1. An information processing apparatus which generates print data to lay out and print a plurality of jobs on one print sheet, comprising:

creation means for creating a plurality of layout candidates to lay out and print a plurality of input jobs on one print sheet;

decision means for deciding the number of times of cutting based on cutting lines on the print sheet and the number of times of rotation of the print sheet necessary in a cutting process for a layout defined by each layout candidate created by said creation means;

input means for inputting a selection condition to select one layout candidate from the plurality of layout candidates;

selection means for selecting a layout candidate to be applied to the plurality of jobs from the plurality of layout candidates created by said creation means, on the basis of the selection condition input by said input means and the number of times of cutting or the number of times of rotation decided by said decision means; and generation means for generating print data to print the plurality of jobs on one print sheet in accordance with the layout candidate selected by said selection means.

2. The apparatus according to claim 1, further comprising:

first setting means for setting level of importance for the number of times of cutting and the number of times of rotation as the selection condition; and calculation means for calculating, on the basis of the level of importance set by said first setting means, cutting difficulty from the number of times of cutting and the number of times of rotation decided by said decision means for each layout candidate created by said creation means.

3. The apparatus according to claim 2, wherein when a plurality of layout candidates with lowest cutting difficulty among cutting difficulties calculated by said calculation means exist, said selection means generates a selection window to select one of the layout candidates having the lowest cutting difficulty, and selects a layout candidate selected via the selection window as the layout for the plurality of jobs.

4. The apparatus according to claim 3, wherein when no selection is made via the selection window, said selection means generates a confirmation window to confirm whether to comply with a default setting layout candidate, and when an instruction to comply with the default setting layout candidate is input via the confirmation window, selects the default setting layout candidate as a layout for the plurality of jobs.

5. The apparatus according to claim 2, further comprising post-processing apparatus selection means for selecting a type of post-processing apparatus for a printed material based on the print data,
wherein said calculation means calculates cutting difficulty corresponding to each layout candidate for each layout candidate created by said creation means on the basis of the number of times of cutting and the number of times of rotation decided by said decision means, and device information of a post-processing apparatus selected by said post-processing apparatus selection means.

6. The apparatus according to claim 1, wherein said generation means generates, on the basis of the layout selected by said selection means, print data to print a cutting line of the layout and a cutting order number representing a cutting order of the cutting line.

7. The apparatus according to claim 1, wherein when the number of jobs to be processed is not less than a predetermined value, said creation means creates a layout candidate to lay out and print the jobs to be processed on one print sheet in area order.

8. The apparatus according to claim 1, further comprising second setting means for setting a limit value of the number of times of cutting and a limit value of the number of times of rotation in correspondence with the layout candidate selected by said selection means.

9. The apparatus according to claim 8, wherein when said second setting means sets limit values, said selection means selects a layout candidate in accordance with the selection condition from layout candidates which satisfy the limit values.

10. A method of controlling an information processing apparatus, comprising a memory, which apparatus generates print data to lay out and print a plurality of jobs on one print sheet, comprising:
a creation step of creating a plurality of layout candidates to lay out and print a plurality of input jobs on one print sheet, wherein the layout candidates are stored in the memory;
a decision step of deciding the number of times of cutting based on cutting lines on the print sheet and the number of times of rotation of the print sheet necessary in a cutting process for a layout defined by each layout candidate created in the creation step;
an input step of inputting a selection condition to select one layout candidate from the plurality of layout candidates;
a selection step of selecting a layout candidate to be applied to the plurality of jobs from the plurality of layout candidates created in the creation step, on the basis of the selection condition input in the input step and the number of times of cutting or the number of times of rotation decided in the decision step; and
a generation step of generating print data to print the plurality of jobs on one print sheet in accordance with the layout candidate selected in the selection step.

11. The method according to claim 10, further comprising:
a first setting step of setting level of importance for the number of times of cutting and the number of times of rotation as the selection condition; and
a calculation step of calculating, on the basis of the level of importance set in the first setting step, cutting difficulty from the number of times of cutting and the number of times of rotation decided in the decision step for each layout candidate created in the creation step.

12. The method according to claim 11, wherein in the selection step, when a plurality of layout candidates with lowest cutting difficulty among cutting difficulties calculated in the calculation step exist, a selection window is generated to select one of the layout candidates having the lowest cutting difficulty, and a layout candidate selected via the selection window is selected as the layout for the plurality of jobs.

13. The method according to claim 12, wherein in the selection step, when no selection is made via the selection window, a confirmation window to confirm whether to comply with a default setting layout candidate is generated, and when an instruction to comply with the default setting layout candidate is input via the confirmation window, the default setting layout candidate is selected as a layout for the plurality of jobs.

14. The method according to claim 11, further comprising a post-processing apparatus selection step of selecting a type of post-processing apparatus for a printed material based on the print data,
wherein in the calculation step, cutting difficulty corresponding to each layout candidate is calculated for each layout candidate created in the creation step on the basis of the number of times of cutting and the number of times of rotation decided in the decision step, and device information of a post-processing apparatus selected in the post-processing apparatus selection step.

15. The method according to claim 10, wherein in the generation step, print data to print a cutting line of the layout and a cutting order number representing a cutting order of the cutting line is generated on the basis of the layout selected in the selection step.

16. The method according to claim 10, wherein in the creation step, when the number of jobs to be processed is not less than a predetermined value, a layout candidate to lay out and print the jobs to be processed on one print sheet in area order is created.

17. The method according to claim 10, further comprising a second setting step of setting a limit value of the number of times of cutting and a limit value of the number of times of rotation in correspondence with the layout candidate selected in the selection step.

18. The method according to claim 17, wherein in the selection step, when limit values are set in the limit second setting step, a layout candidate is selected in accordance with the selection condition from layout candidates which satisfy the limit values.

19. A non-transitory computer-readable medium storing a program for causing a computer to control an information processing apparatus which generates print data to lay out and print a plurality of jobs on one print sheet, the program causing the computer to execute
a creation step of creating a plurality of layout candidates to lay out and print a plurality of input jobs on one print sheet,
a decision step of deciding the number of times of cutting based on cutting lines on the print sheet and the number of times of rotation of the print sheet necessary in a cutting process for a layout defined by each layout candidate created in the creation step, an input step of inputting a selection condition to select one layout candidate from the plurality of layout candidates, a selection step of selecting a layout candidate to be applied to the plurality of jobs from the plurality of layout candidates created in the creation step, on the basis of the selection condition input in the input step and the number of times of cutting or the number of times of rotation decided in the decision step, and a generation step of generating print data to print the plurality of jobs on one print sheet in accordance with the layout candidate selected in the selection step.

* * * * *